United States Patent [19]

Kittirutsunetorn

[11] Patent Number: 5,081,675
[45] Date of Patent: Jan. 14, 1992

[54] SYSTEM FOR PROTECTION OF SOFTWARE IN MEMORY AGAINST UNAUTHORIZED USE

[76] Inventor: Kitti Kittirutsunetorn, 957 Durlane Ct., Sunnyvale, Calif. 94087

[21] Appl. No.: 435,633

[22] Filed: Nov. 13, 1989

[51] Int. Cl.[5] .............................................. H04L 9/00
[52] U.S. Cl. .......................................... 380/4; 380/49
[58] Field of Search ................... 380/3, 4, 49; 364/246.6, 246.7, 246.9, 252.3, 252.4, 252.5, 255.1, 260.81, 286.6, 918.7, 949.71, 949.81, 949.96, 958.1, 958.2, 961, 969, 969.1, 969.3, 969.4, 970, 970.2

[56] References Cited

U.S. PATENT DOCUMENTS

| | | |
|---|---|---|
| Re. 30,957 | 6/1982 | Feistel . |
| 4,040,034 | 8/1977 | Belady et al. . |
| 4,120,030 | 10/1978 | Johnstone ............................ 364/200 |
| 4,168,396 | 9/1979 | Best ..................................... 364/200 |
| 4,195,200 | 3/1980 | Feistel . |
| 4,465,901 | 8/1984 | Best ..................................... 364/200 X |
| 4,471,163 | 9/1984 | Donald et al. . |
| 4,523,271 | 6/1985 | Levien . |
| 4,525,599 | 6/1985 | Curran et al. . |
| 4,558,176 | 12/1985 | Arnold et al. . |
| 4,573,119 | 2/1986 | Westheimer et al. . |
| 4,634,807 | 1/1987 | Chorley et al. . |
| 4,757,534 | 7/1988 | Matyas et al. . |
| 4,759,062 | 7/1988 | Traub et al. . |
| 4,764,959 | 8/1988 | Watanabe et al. . |
| 4,817,140 | 3/1989 | Chandra et al. . |
| 4,847,902 | 7/1989 | Hampson ............................... 380/4 |

Primary Examiner—Thomas H. Tarcza
Assistant Examiner—Tod Swann
Attorney, Agent, or Firm—Skjerven, Morrill, MacPherson, Franklin & Friel

[57] ABSTRACT

The address space of a data storage device is arbitrarily divided into a plurality of data-segments and a different data scrambling algorithm is assigned to each of the data-segments. A programmable address scrambling device is interposed between the address port of the data storing device and a system address bus. An appropriate one of many possible scrambling keys must be supplied to the programmable address scrambling device for each of the data-segments in order to retrieve a desired dataword within each of the data-segments.

20 Claims, 23 Drawing Sheets

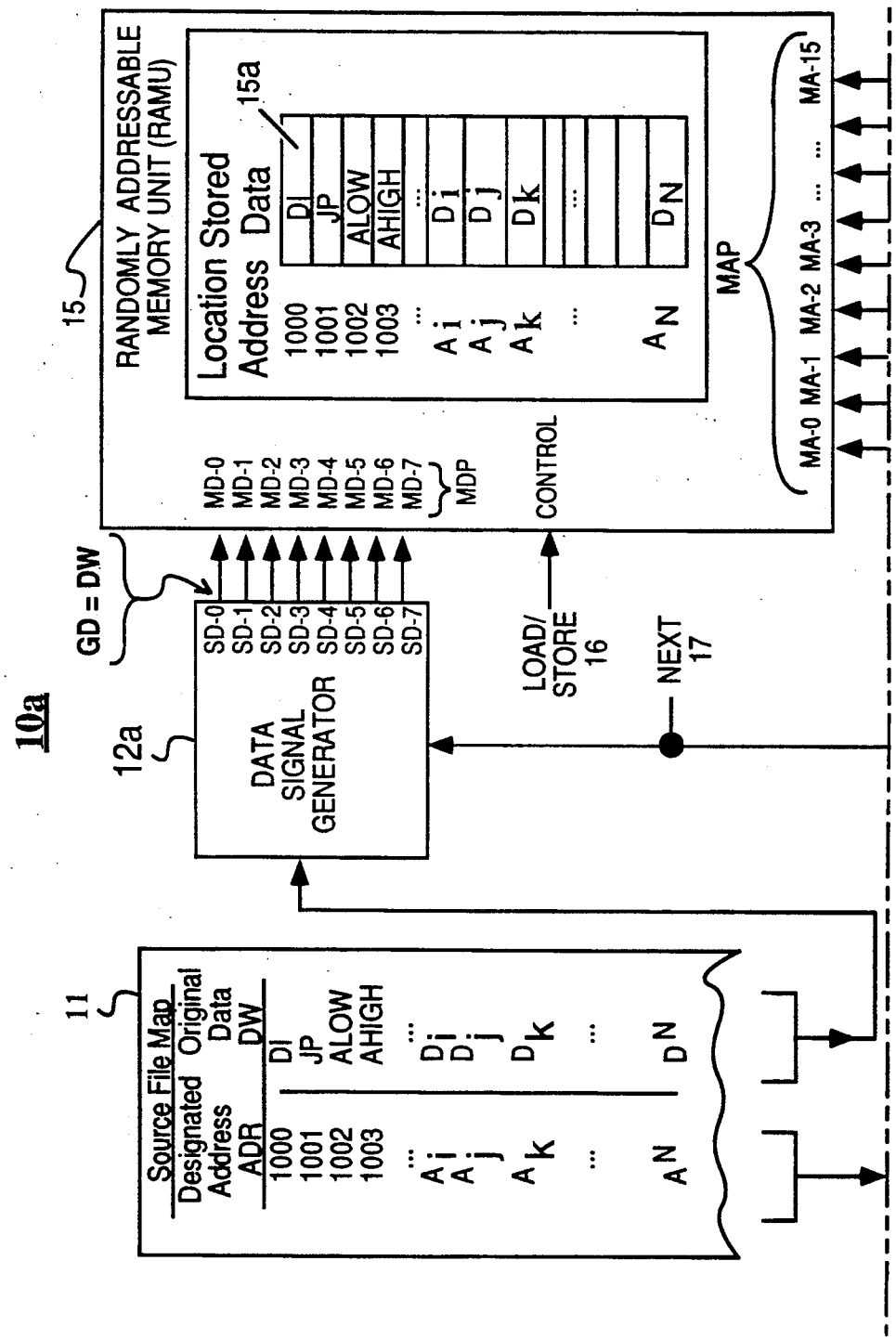

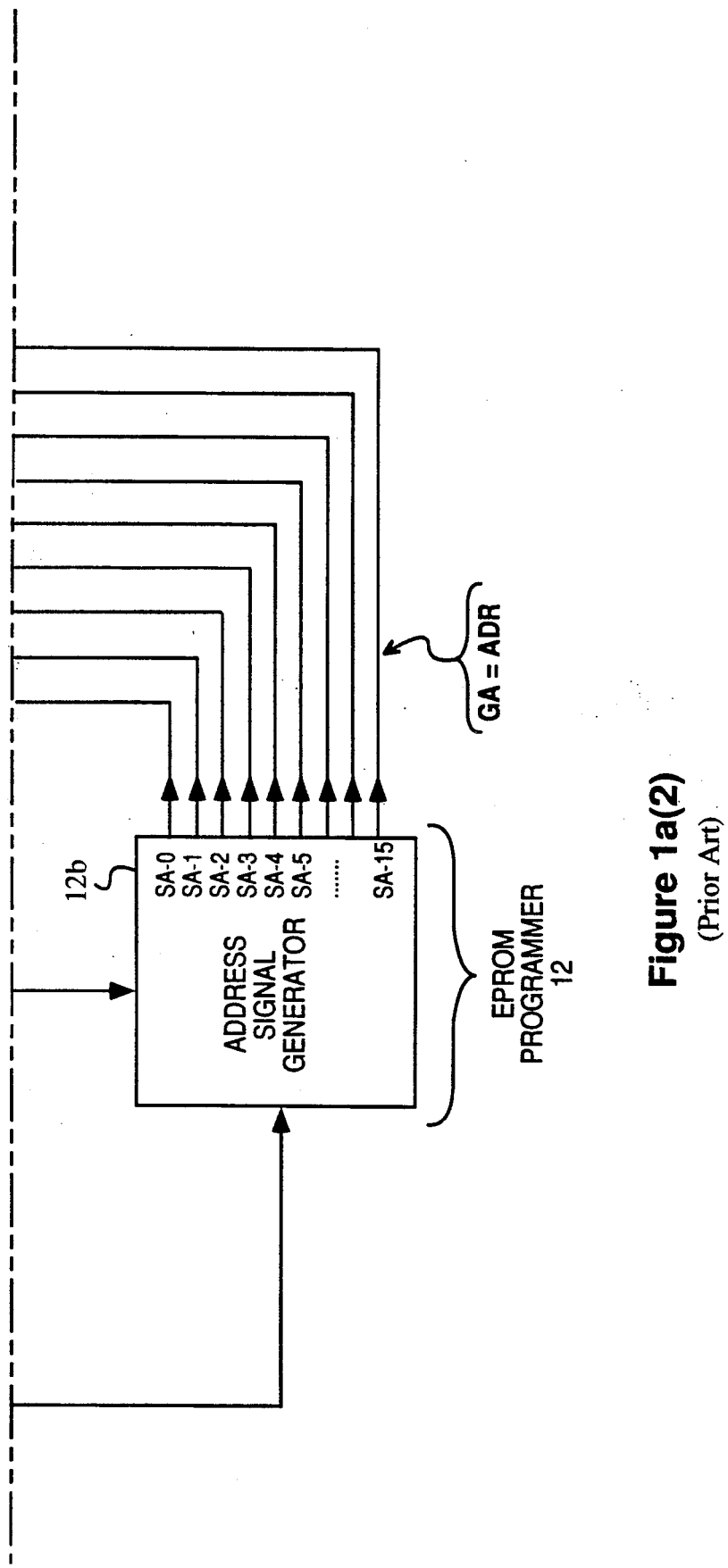
Figure 1a(2)
(Prior Art)

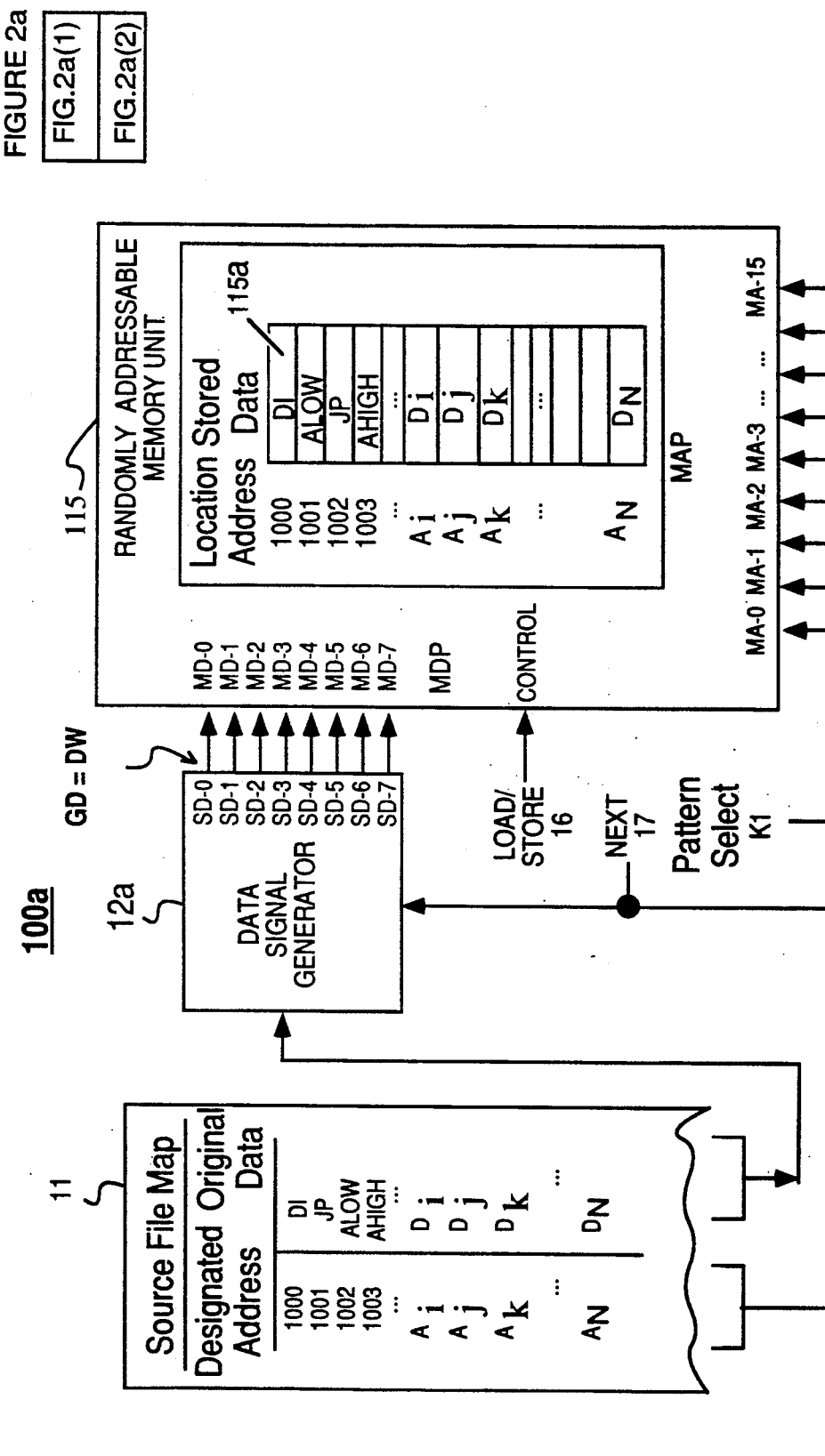

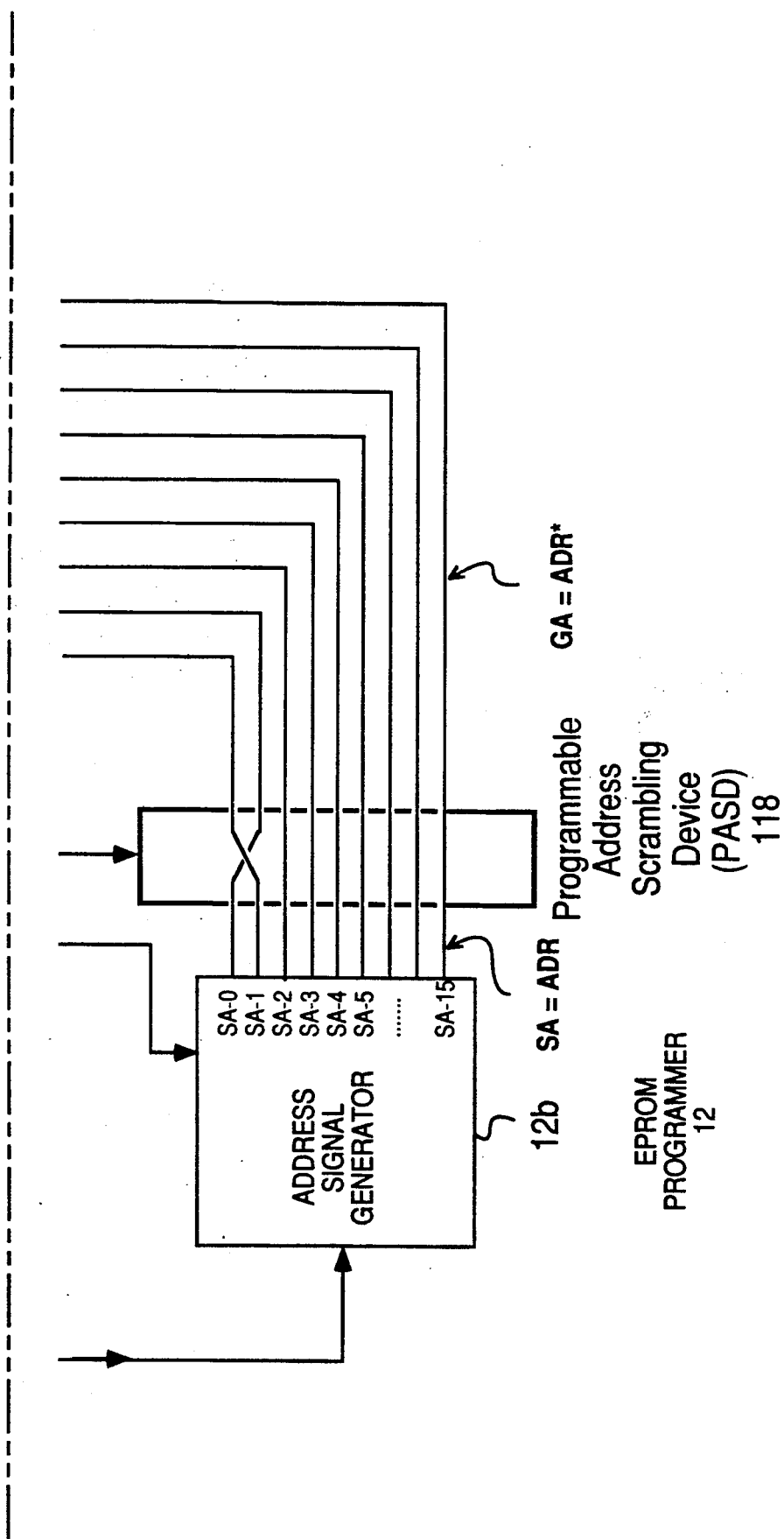
Figure 2a(2)

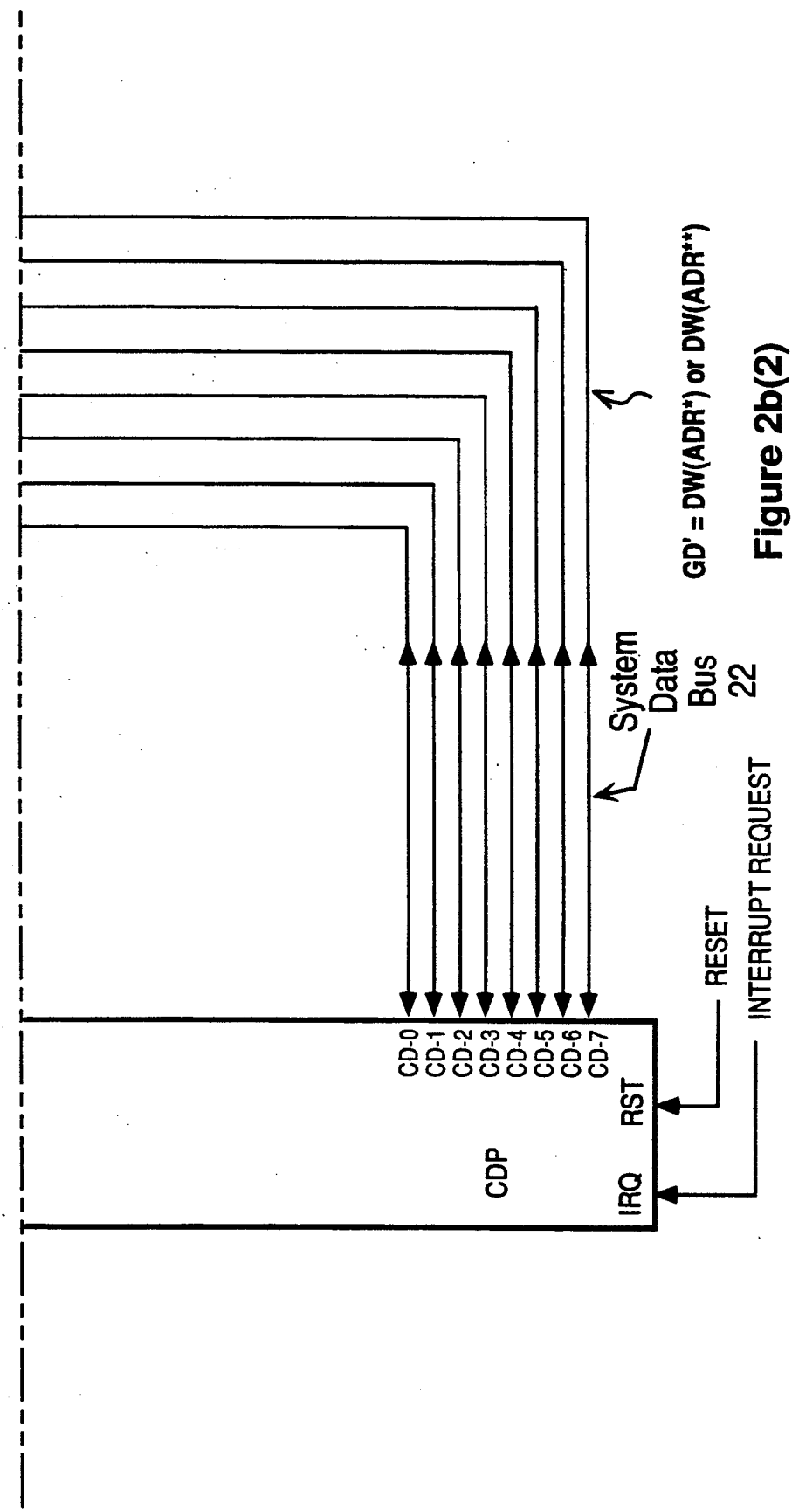
Figure 2b(2)
GD' = DW(ADR*) or DW(ADR**)

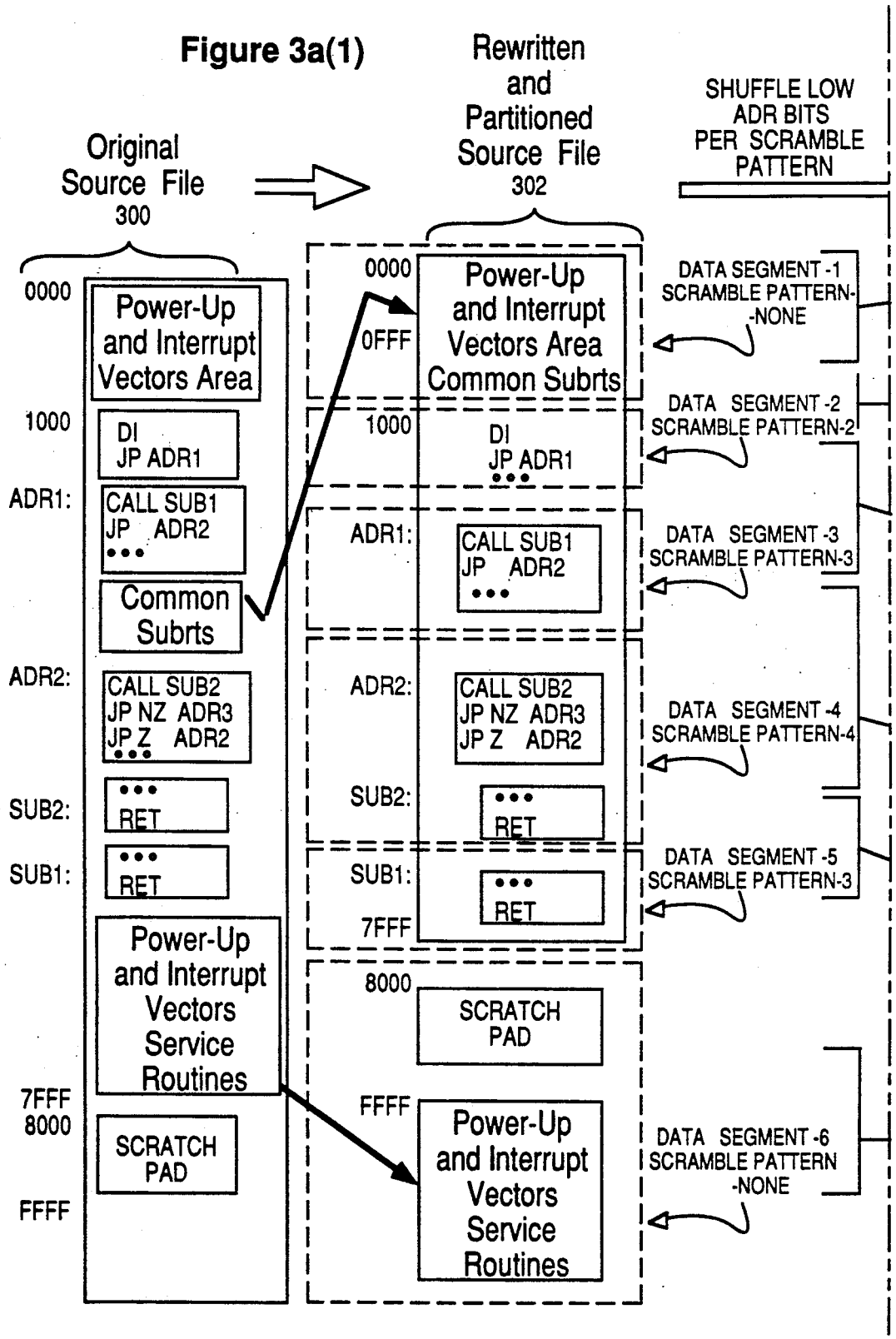

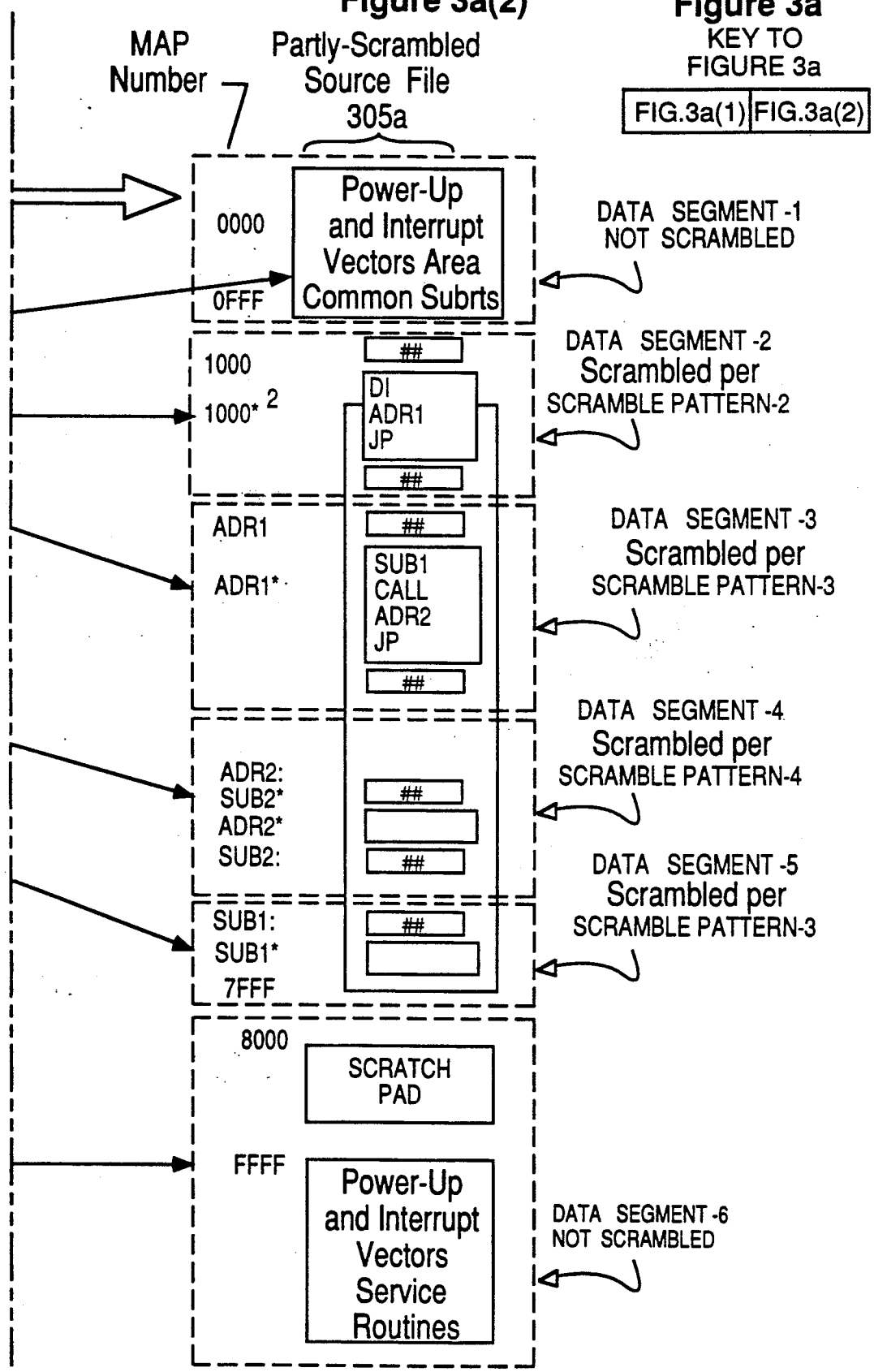

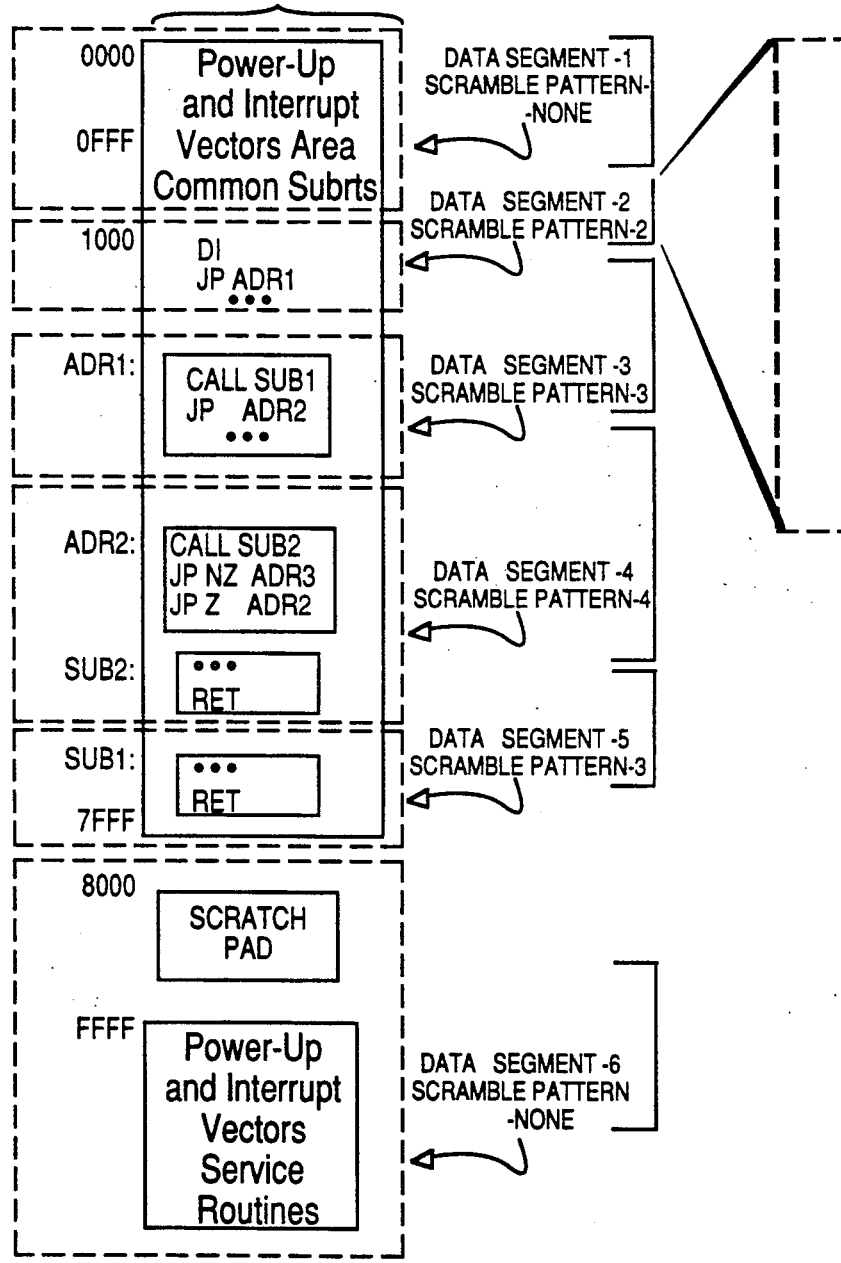

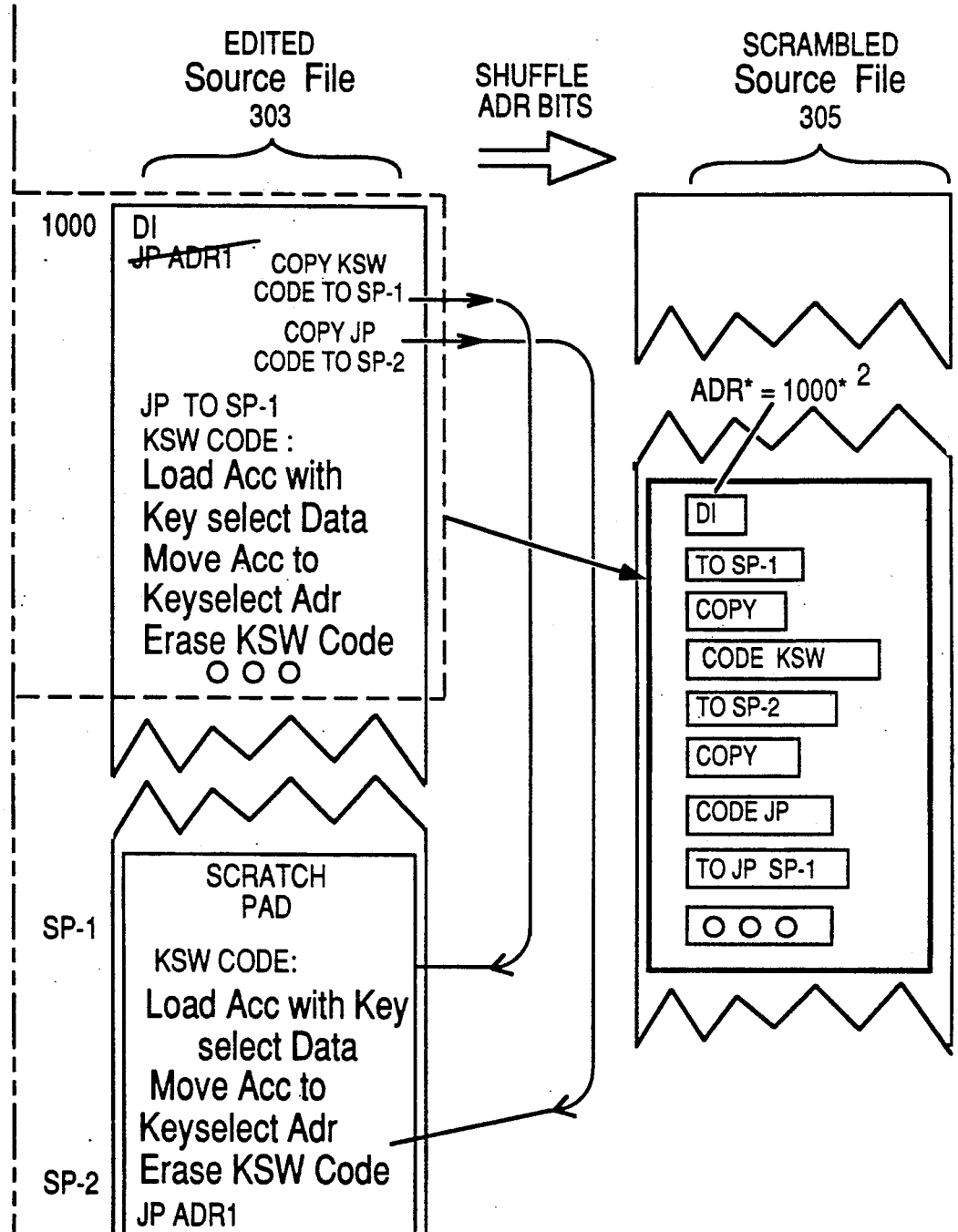
Figure 3b(2)

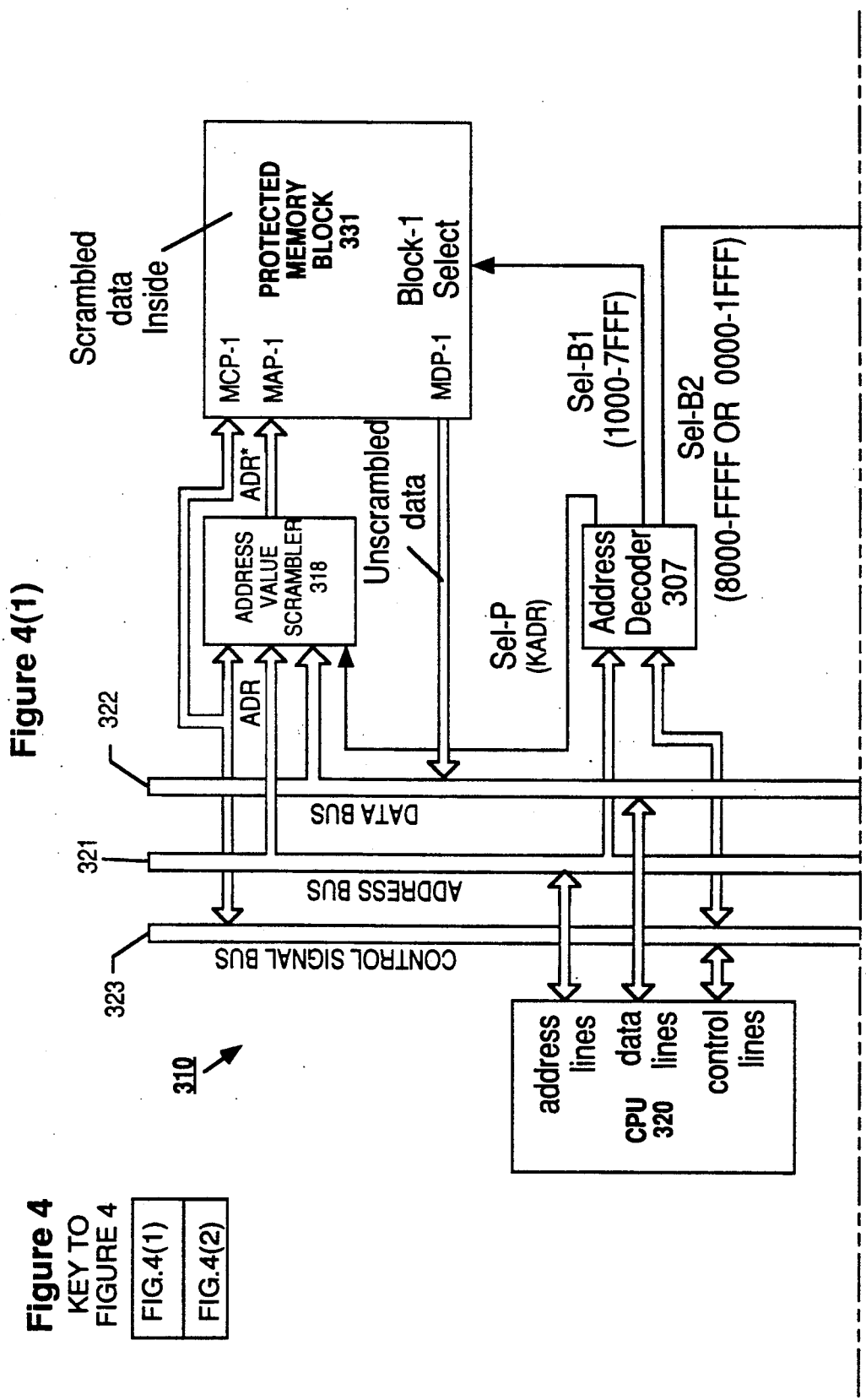

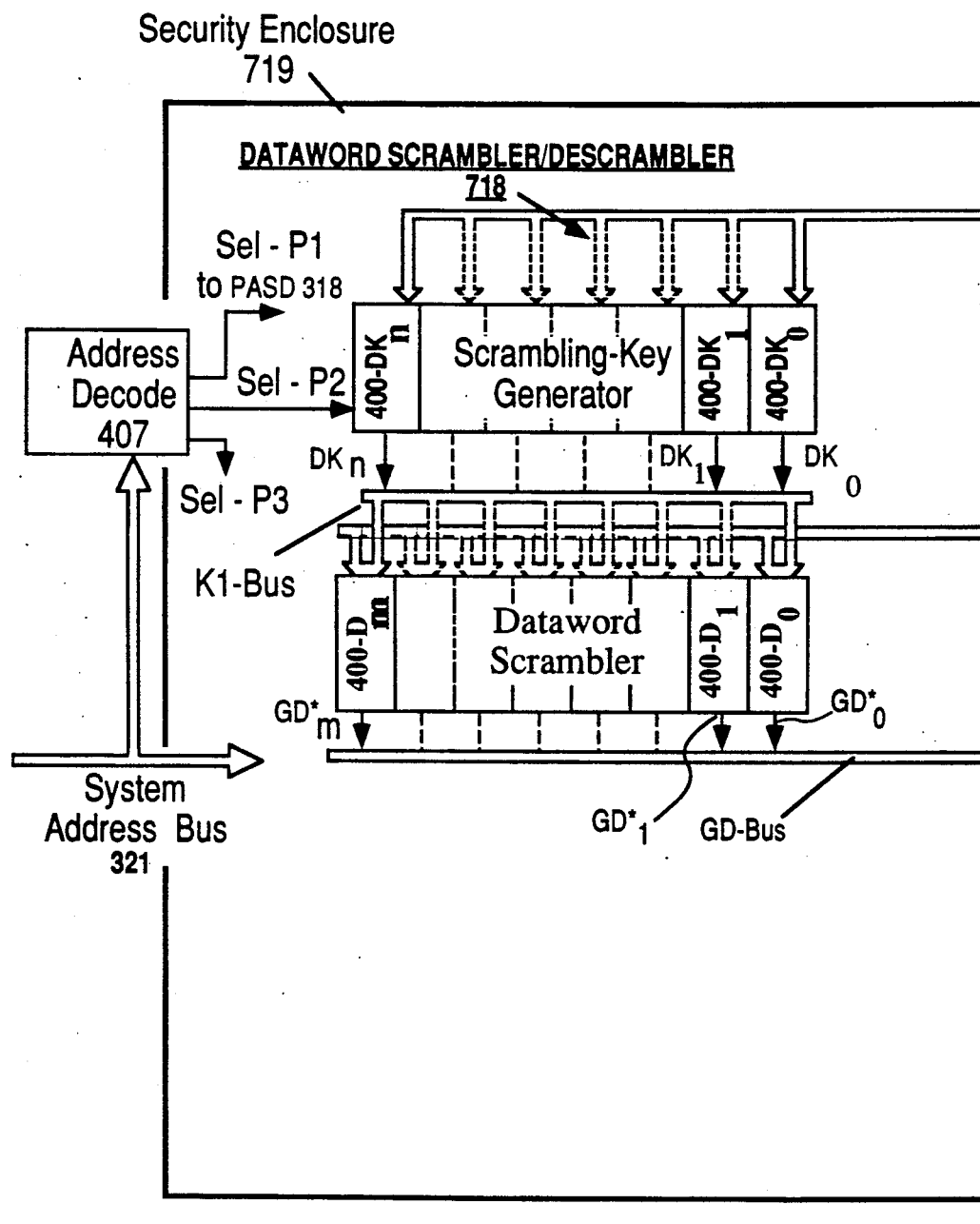

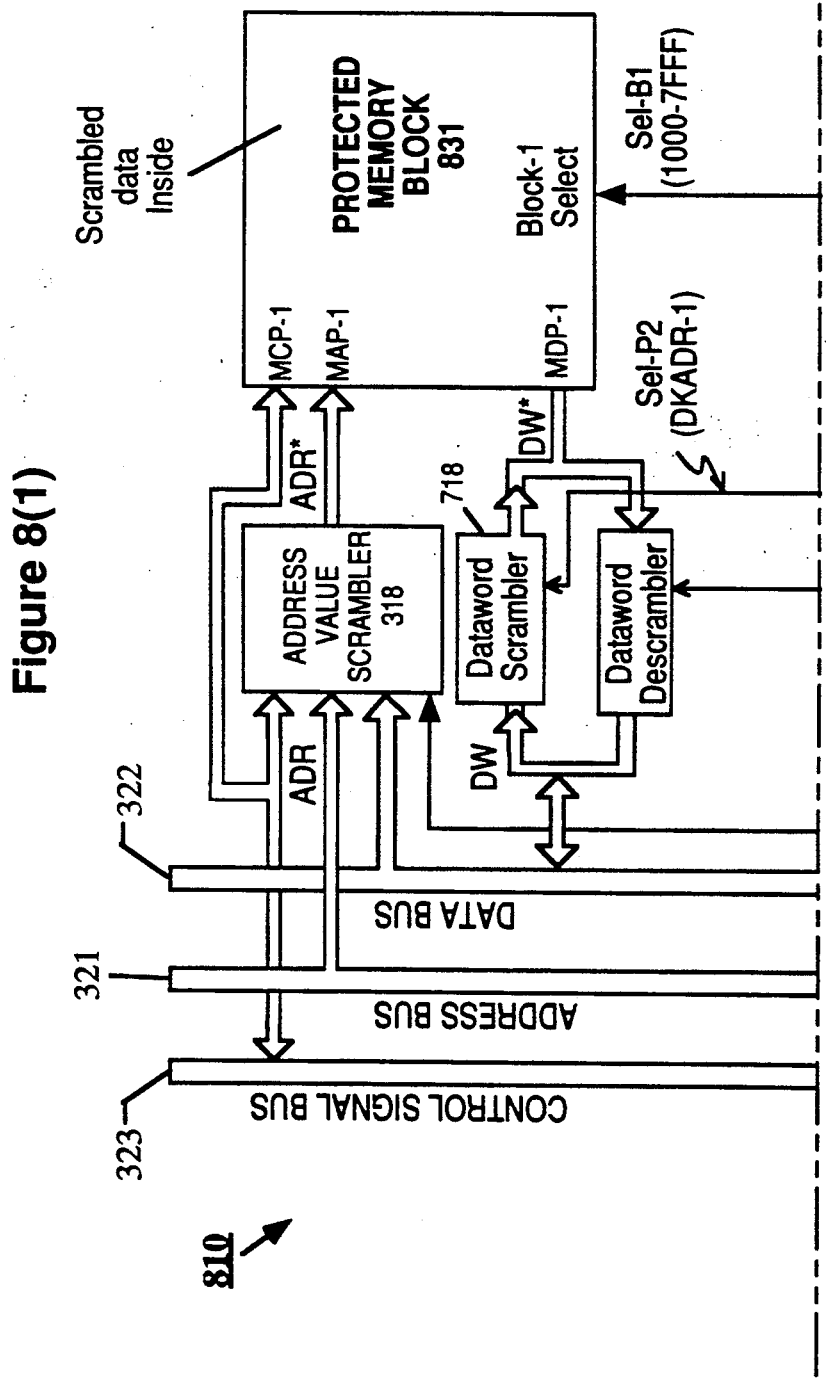

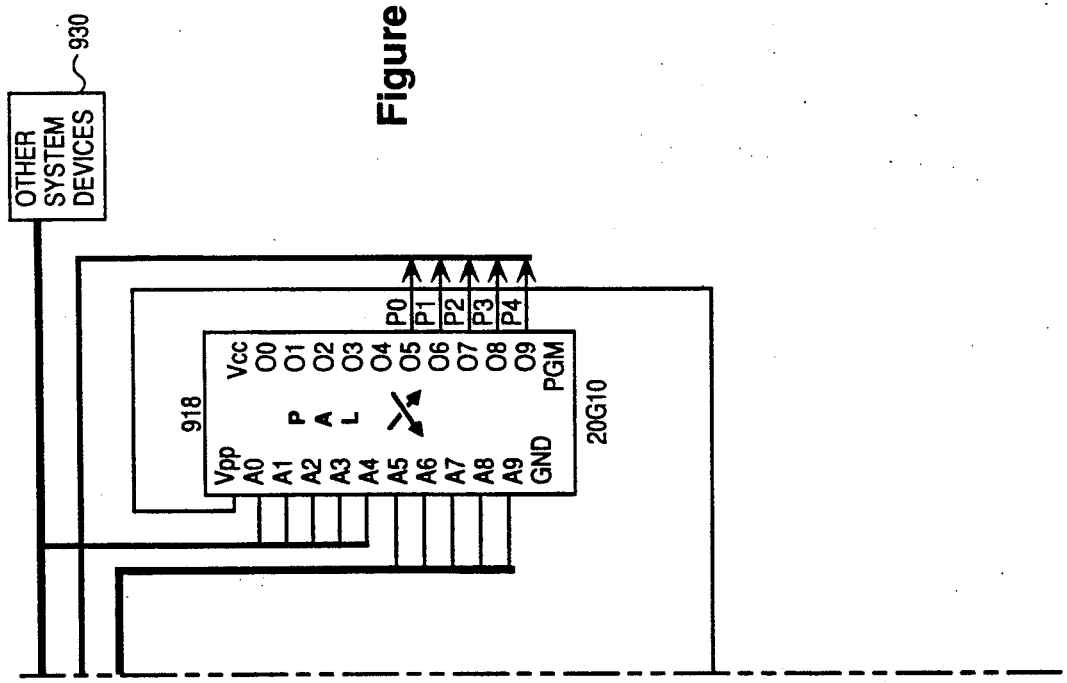

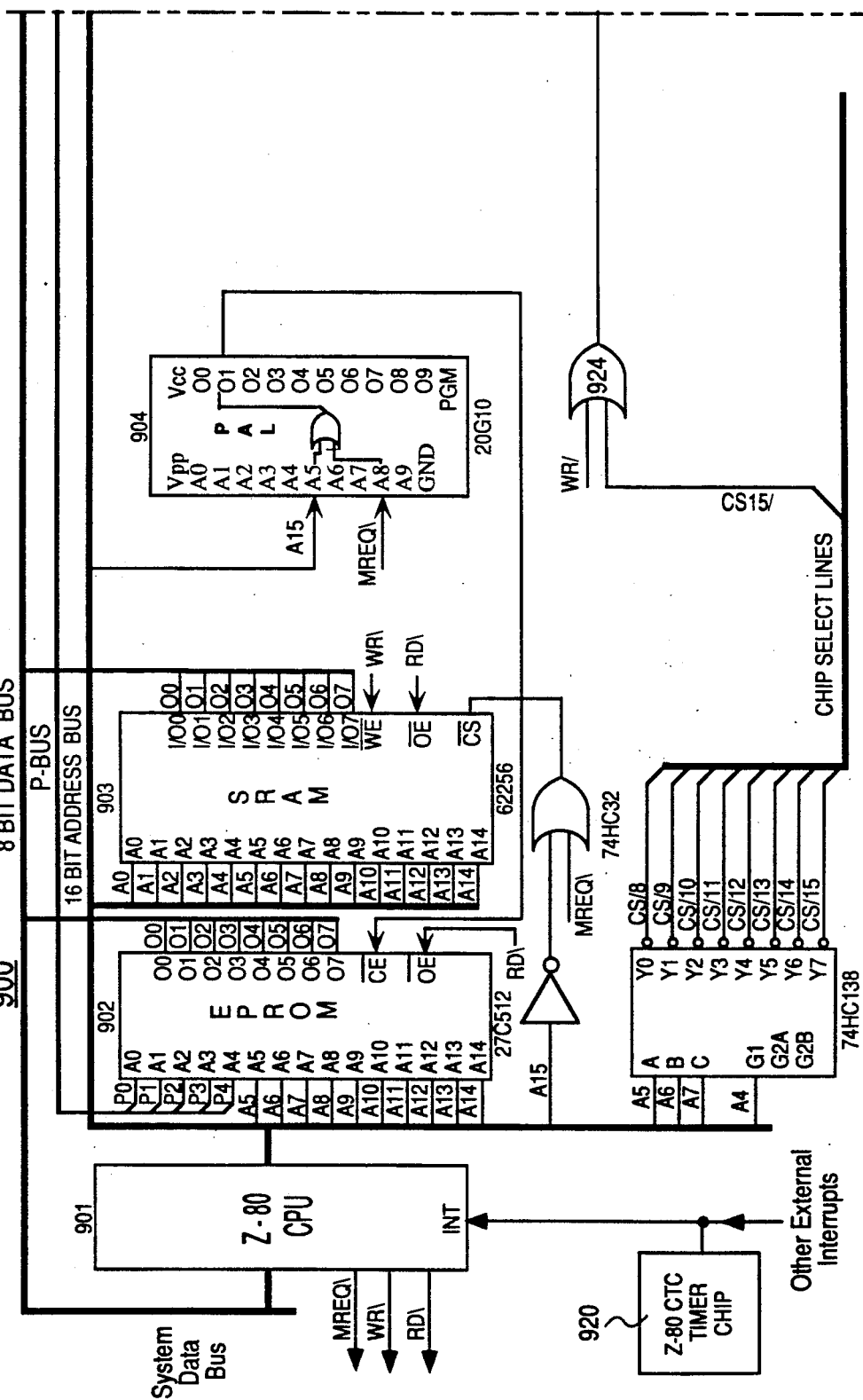

SYSTEM FOR PROTECTION OF SOFTWARE IN MEMORY AGAINST UNAUTHORIZED USE

BACKGROUND OF THE INVENTION

1. Field of the Invention

The invention is related generally to data encryption and more specifically to a method and apparatus for protecting software stored in memory from unauthorized use and/or copying.

2. Description of the Relevant Art

As a result of advances in the art of digital data production and storage, it is now possible to store vast amounts of information (i.e., computer software) in a memory device such as an electrically programmable read only memory chip (EPROM), a magnetic disk or an optical disk. Typically, the information is proprietary and is subject, at least legally, to usage restrictions so that only those who are authorized by agreement to copy, use or enjoy the stored data (software), are supposed to derive benefit from it. But because there have been many advances made in the art of digital information duplication, it is now possible for even relatively unskilled persons to duplicate proprietary data stored in memory devices with ease, and as such, the problem of unauthorized copying and use of proprietary software (piracy) is rampant throughout the industry.

For the case of EPROM's or other read-only types of memory, an EPROM duplicator is used. The duplicator sequentially addresses each location in the address space of the original chip and copies the output data into a similar location of a second chip. For the cases of disks, duplication is performed track by track and sector by sector in much the same way. The magnetic pattern of an original disk is blindly copied onto a second disk.

Numerous methods have been proposed for protecting data in memory devices from unauthorized copying and/or use, but as a general rule, the previous methods tend to be overly complex and usually slow down the performance of the computer system in which they are implemented. While some methods resist the copying of ROM chips by an EPROM duplicator, few are resistant to copying through the use of an in-circuit-emulator (ICE) which allows sophisticated pirates to peek into protected memory regions through the "eyes" of the CPU. An ICE probe is inserted into a proprietary circuit in place of the circuit CPU and the entirety of software information stored within protected memory is then exposed for scrutiny and/or rapid duplication.

A description of previous works in the general fields of data encryption and protection follows. Not all of these works are directed to the problem of protecting stored data from unauthorized use. Their approaches may nonetheless help in understanding the present invention and thus they are incorporated here by reference.

U.S. Reissue Pat. No. 30,957, "Variant Key Matrix Cipher System" issued June 1, 1982, to Feistel (based on parent U.S. Pat. No. 4,195,196) describes a serial data transmission scheme in which an enciphering key is switched for every bit of a serially transmitted message. Key switching occurs at the receiver end in the same manner for every bit of the received message. Data is not segmented into blocks of predetermined sizes. The use of a key-switching method for protecting data stored in memory is neither disclosed nor suggested.

U.S. Pat. No. 4,817,140, "Software Protection System Using A Single-Key Cryptosystem, A Hardware-Based Authorization System and A Secure Co-processor" issued Mar. 28, 1989 to Chandra et al. describes a software protection system wherein a block of software is partitioned into an encrypted portion and a plain text portion. Token data is stored within a read-once separate cartridge and sent to a co-processor device for enabling de-encryption of the encrypted portions of the software block. A user needs to have possession of the cartridge in order to prove his right to decipher and use the encrypted software portion. There is only one encryption key (token). When it is comprised the security of the entire software package is comprised.

U.S. Pat. No. 4,764,959, "Single-Chip Microcomputer with Encryptable Function on Program Memory" issued Aug. 16, 1988 to Watanabe describes a single-chip microcomputer having a memory section integrated within its package such that the software contents of the memory section cannot be scanned directly. When proprietary data stored in the memory is to be transmitted to a point outside the chip, the microcomputer first encrypts the data before transmitting it externally so that only those with an authorized key can decrypt the transmitted block of data. Only one encryption key is used, and thus, the entirety of the internal software is compromised once the key is compromised. Inclusion of a computer on the same chip which holds data tends to limit the information storing capacity of the chip.

U.S. Pat. No. 4,759,026, "Arrangement for a Method for Protecting Private Security Codes from Unauthorized Disclosure" issued July 19, 1988 to Traub discloses a system wherein a random number generator is used for generating an unpredictable encryption code. A decryption key is temporarily displayed by a data encrypting machine and only those in possession of this key are able to use data encrypted by the encrypting machine.

U.S. Pat. No. 4,757,534 "Code Protection Using Cryptography" issued July 12, 1988 to Matyas discloses a method for protecting software that is distributed by disk to members of the public. A unique encryption algorithm and key is used for each copy of the program. To run the program on a computer, a user must be in possession of a designated smart card in which there is stored the appropriate decryption key.

U.S. Pat. No. 4,634,807 "Software Protection Device" issued Jan. 6, 1987 to Chorley et al. disclose a software protection device ("SPD") which is used for securely holding a secret key needed to unlock an encrypted software module.

U.S. Pat. No. 4,573,119, "Computer Software Protection System" issued Feb. 25, 1986 to Westheimer discloses a software protection system including an address transform means and a data transform means. Upper and lower boundary addresses are used to designate portions of a RAM file that are to be protected. A read only memory device (ROM) is used in the address transformation circuit for converting an input address into an output address. This inclusion of the ROM device in the address path of the system increases the data access time of the CPU.

U.S. Pat. No. 4,558,176 "Computer Systems To Inhibit Unauthorized Copying, Unauthorized Usage, and Automated Cracking of Protected Software" issued Dec. 10, 1985 to Arnold discloses a memory protection system wherein means are provided for detecting memory access by automated encipher cracking programs and for altering the encrypted data once such an enciphering attempt is detected.

U.S Pat. No. 4,525,599 "Software Protection Methods And Apparatus" issued June 25, 1985 to Curran et al. discloses a system wherein means are included for detecting an invalid program event such as may occur when a microprocessor emulator (ICE) is used to attempt unauthorized copying. A switchable encryption/decryption means is included in the system for switching from a first operating mode to a second operating mode whenever an invalid program event is detected by an address bus monitoring means (when access to a "trap" address is detected).

U.S. Pat. No. 4,471,163 "Software Protection System" issued Sept. 11, 1984 to Donald et al. discloses a system wherein a program number must be combined with a lock number and a key number in order to enable usage of a protected program stored in memory.

The above-mentioned works suffer in general from the problems of excessive cost, overly complex circuitry and user inconvenience.

With respect to excessive cost, the price of memory devices should be dictated primarily by their data storage capacity and not by the cost of associated software protection means. The protection means function primarily to protect the rights of the software copyright owner rather than providing convenience and enjoyment to the end user. It is not fair to ask end users to cover the cost of a complex protection scheme.

With respect to convenience, users generally do not want to bother with the task of attaching and detaching a variety of so called "dongles" (sealed hardware devices which store a decryption key such that only those in possession of the dongle can use the protected software) to their computers as they switch from one software package to another software package. Dongles can consume unacceptably large areas of a desktop as more and more protected software packages are acquired from different vendors.

With respect to computer performance, it is undesirable to have a software protection scheme which substantially slows the instruction execution speed of a CPU. There should be a way to protect the rights of legitimate software originators and distributors (copyright licensors and licensees) without inconveniencing end users. The cost of the protection means should be minimal to end users and degradation to CPU execution speed should also be minimal.

SUMMARY OF THE INVENTION

It is an object of the invention to provide a method and apparatus which protects digital data from unauthorized copying and/or use.

It is another object of the invention to provide a memory security system which is resistant to unauthorized scrutiny and duplication by use of an in-circuit emulator (ICE).

It is a further object of the invention to provide a security system which is not overly complex or costly to implement, which does not substantially slow down the operation of a computer which needs to access such secured information and which does not call for the attachment of hardware "dongles" to the user's computer.

In brief, the present invention requires that end users sequence through the data of a protected memory device according to a prescribed addressing sequence. When this is done a prespecified sequence of address bus and/or data bus descrambling keys are generated to sequentially unlock each of a large number of protected data segments within the memory device. Deviation from the prescribed addressing sequence usually results in the generation of inappropriate keys and this causes the data that is retrieved from the memory device to become nonsense information. Even if an appropriate key is selected by guesswork and an in circuit emulator (ICE) is utilized to peek into memory through the "eyes" of the CPU, only one segment will appear in unscrambled form while the rest of the segments will remain scrambled and thus secured.

Special hardware "dongles" are not needed. According to the invention, stored information is instead protected by the length of time it takes to step through all possible combinations of sequences of storage locations within protected memory device without deviating from the prescribed addressing sequence. The prescribed addressing sequence is designed to enable normal usage (i.e., executing an "application" program as it was intended to be executed) but to impede unauthorized usage such as for copying or scanning A number of addressing permutations other than the prescribed addressing sequence should be offered to a would-be pirate so that the prescribed sequence is not easily discoverable. The number of other addressing permutations may be made astronomically large simply by adding "dead end" paths at branch points throughout the body of the protected software. Preferably, branch decisions are made on the basis of volatile information which is developed only by properly following the prescribed addressing sequence, by allowing certain external or internal events (i.e., timer interrupts) to take place and by storing this sequence-developed information in volatile memory (i.e. RAM). (RAM is an acronym here for random access volatile memory.) When power is turned off or a RAM erase operation is performed this volatile data is destroyed and thus kept secured away from would-be pirates. Code may be written which forces legitimate users to enter a volatile password or to exercise their protected memory devices over long periods of time before an appropriate key will be generated for some rarely-used sections of protected memory. Usually, non-authorized users do not wish to spend long periods of time (i.e., hours or days) developing the necessary volatile information or series of events for properly traversing through the locations of the protected memory device according to the prescribed addressing sequence. And as such, these non-legitimate users (i.e., pirates) face the problem of having to make a correct branching decision at each branch point in order to generate an appropriate key for each locked segment that is to be quickly copied or otherwise used. If an incorrect guess is made at any branch point, the memory device begins to produce nonsense data and the would-be pirate must begin anew from a starting location (RESET point) within memory where the prescribed sequence starts The probability of making correct guesses decreases as more branching decision points are added.

The invention can be explained in lay terms by analogy to a theme found in many arcade games. A knight is set off on a quest through a Medieval castle in search of lost treasure. The treasure is entombed in a secret chamber somewhere within the castle, but to reach the treasure, the knight must successfully travel through a maze of rooms according to a predetermined sequence and within a limited time, fighting off monsters and avoiding pitfalls along the way. Entry to each room is barred by a locked door. The knight must find an appropriate key hidden in one of the previously visited rooms before the knight can enter a new room. Often, the knight must perform a prespecified ritual within a key hiding room in order to obtain the hidden key. Each room is filled with traps and other dangers which the knight must traverse while trying to find a key for a subsequent room. If a trap is not successfully traversed, the knight is sent back to the beginning of the maze, the game restarts, and the knight must begin the quest anew. Each next successive room of the maze can only be entered if all previous rooms of the maze sequence had been conquered and only if the key for the next successive room has been found in one of the previous rooms. The maze is often filled with numerous diversionary paths which, if entered, lead the knight away from the lost treasure and waste precious time.

With this game theme in mind, the invention can be explained as follows. A block of software that is to be protected (treasure) is partitioned into two or preferably many more segments (rooms) and each segment is encrypted (locked) with a unique encryption key. The software segments (rooms) need to be accessed according to a prescribed sequence (maze) and the key for each next segment of the sequence is generated only by properly traversing through a previous segment and executing a preselected sequence of code (key generating ritual) found therein.

The present invention differs somewhat from the above described game theme in that treasure is not concentrated in a single room but is rather distributed throughout the rooms of a maze. The treasure is of course, the digital information of the entire software block that is stored in a memory unit whose contents are to be protected from use and/or scrutiny and/or copying by an unauthorized person. A large number (i.e., 8 or more) of keys are preferably employed so that the compromise of a single key does not compromise the security of the entirety of the protected information although perhaps a small segment might be compromised.

In accordance with one embodiment of the invention, a digital data processing system is provided with: a system address bus (SAB) for carrying nonscrambled binary address signals; a system data bus (SDB) for carrying nonscrambled binary data signals and a system control bus (SCB) for carrying control signals which control the flow of signals through the system data bus (SDB) and the system address bus (SAB). There is further provided: a first randomly addressable memory unit (RAMU-1) which has a memory address port (MAP-1) for receiving a plurality of scrambled memory address numbers (ADR*) each of which designates a numbered storage location within the first memory unit (RAMU-1) and a memory data port (MDP-1) for transferring either scrambled data words (DW*) or nonscrambled data words (DW) to and/or from unique memory locations whose positions are identified by the scrambled memory address numbers (ADR*) presented to the memory address port (MAP-1) of the first memory unit. There is further provided: a second memory unit (RAMU-2) having a memory address port (MAP-2) for receiving nonscrambled address numbers (ADR) and a memory data port (MDP-2) for transferring nonscrambled data words (DW). The second memory unit (RAMU-2) preferably includes a volatile (RAM) section that is used by key switching operations. After a key switching operation is performed, the relevant data within the volatile (RAM) section is erased or overwritten.

Digital information is stored within the first and second memory units (RAMU-1 and RAMU-2) preferably in the form of fixed length bit sequences (i.e., bytes) and these bit sequences are referred to here as data words. The data words, which can be encrypted (DW*) or nonencrypted (DW), are distributed among the numbered memory locations of the first memory unit (RAMU-1) according to two or more location scrambling algorithms (also referred to here as address space transformations, or address mappings and denoted herein as ADR→ADR*$^i$, ADR→ADR*$^j$ where the suffix, *, added to an address value, ADR, indicates that the address value has been scrambled by a transformation function, *$^i$, and the superscript, i, in the operation symbol, *$^i$, denotes a specific scrambling algorithm). Access to a memory location within the first memory unit (RAMU-1) which contains a desired data word is obtained by applying an appropriately scrambled memory address number (ADR*$^k$) to the address input port (MAP-1) of the memory unit, where k denotes here a "key" for selecting the appropriate transform function, *$^k$ from among a large number of such transform functions, *$^1$, *$^2$, *$^3$, ..., *$^n$. The algorithms *$^1$, *$^2$, *$^3$, ..., *$^n$ which transform a non-scrambled address number (ADR) to an appropriate scrambled address number (ADR*) are kept proprietary.

There is further provided a programmable address scrambling device (PASD) which is interposed between the system address bus (SAB) and the address input port (MAP-1) of the first memory unit (RAMU-1) for transforming nonscrambled address numbers (ADR) placed on the system address bus (SAB) in accordance with one of a plurality of predefined scrambling algorithms *$^1$, *$^2$, *$^3$, ..., *$^n$ in order to generate an address signal GA which represents either an appropriate scrambled address number (ADR*) or an inappropriate scrambled address number (ADR). (Double asterisks, , are used here to denote that a wrong scrambled address value, ADR**, has been generated in an attempt to access a dataword in a memory location within the first memory unit whose physical address value is ADR*.) The scrambled address signal (GA=ADR* or GA=ADR**) generated by the address scrambling device (PASD), whether appropriate (GA=ADR*) or inappropriate (GA=ADR**), is applied to the address input port (MAP-1) of the first memory unit. If the generated address signal is appropriate (GA=ADR*) and it represents the physical address number, ADR*, which correctly identifies the location of a desired piece of information, then the desired information piece will be retrieved from the data port (MDP-1) of the randomly addressable memory unit (RAMU-1) and placed on the system data bus (SDB) for access by a data requesting device (i.e., the system CPU). But if the address signal generated by the address scrambling device (PASD) is inappropriate (GA=ADR) and does not match the physical location number of a desired piece of information, a wrong (inappropriate) piece of information (DW) is retrieved for use by the data requesting device.

A different key, k, is preferably used for scrambling each of an arbitrary number of user-defined partitions (segments) in the memory space of the memory unit and a guess must be made for each memory location as to whether it belongs to one partition or another as well as to whether one or another of plural keys has been assigned to the partition.

Nonscrambled data is stored in the second memory unit (RAMU-2). Frequently accessed code, such as global program variables or globally-shared subroutines, is preferably stored in the second memory unit (RAMU-2). Code which is accessed out of turn, such as interrupt vectors and interrupt service routines, is also stored in the second memory unit (RAMU-2). An address scrambling device is not interposed between the address port (MAP-2) of the second memory unit and the system address bus (SAB), and accordingly, no key-switching needs to take place when code within the second memory unit (RAMU-2) is accessed.

Preferably, the address scrambling device (PASD) is dynamically programmable so that its address scrambling algorithm, $*^k$, can be altered "on the fly" by a CPU while the CPU is executing instructions. Whenever the CPU needs to access a block of memory whose information has been shuffled with a new key, k; the CPU needs to first select the next appropriate one of a large number of scrambling patterns (i.e., ADR→ADR$*^1$, ADR→ADR$*^2$, ..., ADR→ADR$*^k$..., ADR→ADR$*^n$) which can be generated by the scrambling device if the next to be retrieved information within the first memory unit (RAMU-1) is to be properly addressed. The appropriate key, k, is found in or generated by a previously accessed block of information within the memory unit and this key, k, must be applied to the programmable address scrambling device (PASD) before one can access in a desired sequence (ADR→ADR$*^k$) the out-of-sequence stored data within a next block of the memory unit. Preferably, the address scrambling device interposes a minimal number (i.e., 0, 1, 2 or 3) of gate levels (i.e., NOT, AND and OR) between the system address bus (SAB) and the memory address port (MAP-1) of the first memory unit (RAMU-1) so that minimal time delay is added to system performance by the address transforming operation ADR→ADR*.

In the above described embodiment, the data that is requested by a system device (i.e., a system CPU), originates from a data-source file which has been arbitrarily partitioned into two or more segments (encryption modules). The partitioning map is kept proprietary. A unique address scrambling algorithm, ADR→ADR$*^k$ is assigned to each segment which is to be secured and the key, k, for each algorithm is hidden within one or more of a plurality of other file segments from which entry is to be allowed into the secured file segment. When entry is attempted from an inappropriate one of the other file segments, no key or an inappropriate key (k*) will probably be produced and the output signal, GA, generated by the PASD will be an inappropriate physical address number, GA=ADR. As a consequence, nonsense data words (DW) will be retrieved from the protected memory unit (AAMU-1).

The preferred process for leaving a first protected memory segment within the protected memory unit (AAMU-1) and entering a second protected memory segment comprises the steps of downloading an entry routine into a non-scrambled (nonprotected) portion of volatile memory (within the second memory unit, RAMU-2) and executing the entry routine. The downloaded entry subroutine includes an algorithm for generating a key, k, necessary for creating the mapping algorithm (ADR→ADR*) of the next to be accessed segment in the protected memory unit (RAMU-1). Control of the system CPU is temporarily given to the entry routine located in the unscrambled portion of memory (RAMU-2) so that a key changing operation ($k_i$→$k_j$) can be carried out without halting the CPU. After the key changing operation is executed, the key changing code can be erased from the volatile memory section and the entry routine can transfer control of the system CPU to the second protected memory segment whose data is located in a scrambled portion of the first memory unit (RAMU-1).

Only one segment of the partitioned memory (RAMU-1) is unlocked at a time. Accordingly, an in-circuit-emulator (ICE) cannot be used to scrutinize the entirety of the memory device (RAMU-1) at one time. The user of ICE does not know where one partition (segment) ends and another one begins. Access to a next segment within a protected file may be restricted such that the CPU or other data requesting device must sequence through a relatively long series of previous segments and interact in a prescribed manner with many external events (i.e., I/O interrupts) while not branching unwittingly into a trap-door path within any unlocked segment. The time needed for traversing through the proper sequence of operations can be made arbitrarily long when the maze is properly designed.

The methods described here are not intended to be totally pirate-proof but merely to be ones which make it economically impractical to pirate protected information. Economic impracticality arises from the relatively large amount of time (i.e., hours, days or weeks) needed to sequence through, identify, and record the boundaries of all the segments and their associated keys.

BRIEF DESCRIPTION OF THE DRAWINGS

FIGS. 1a, 1a(1) and 1a(2) is a block diagram illustrating a previous method for storing a sequential data file in a randomly addressable memory unit.

FIGS. 2a(1), 2a and 2a(2) is a block diagram illustrating how the data of a sequential data file may be stored out of sequence in a randomly addressable memory unit according to the invention.

FIGS. 3A, 3a(1) and 3a(2) show a first portion of a memory protection method in accordance with the invention.

FIGS. 3B, 3b(1) and 3b(2) show a second portion of a memory protection method in accordance with the invention.

FIGS. 9, 9(1) and 9(2) is a schematic diagram of another computer system according to the invention.

DETAILED DESCRIPTION OF THE INVENTION

Figure 1B:
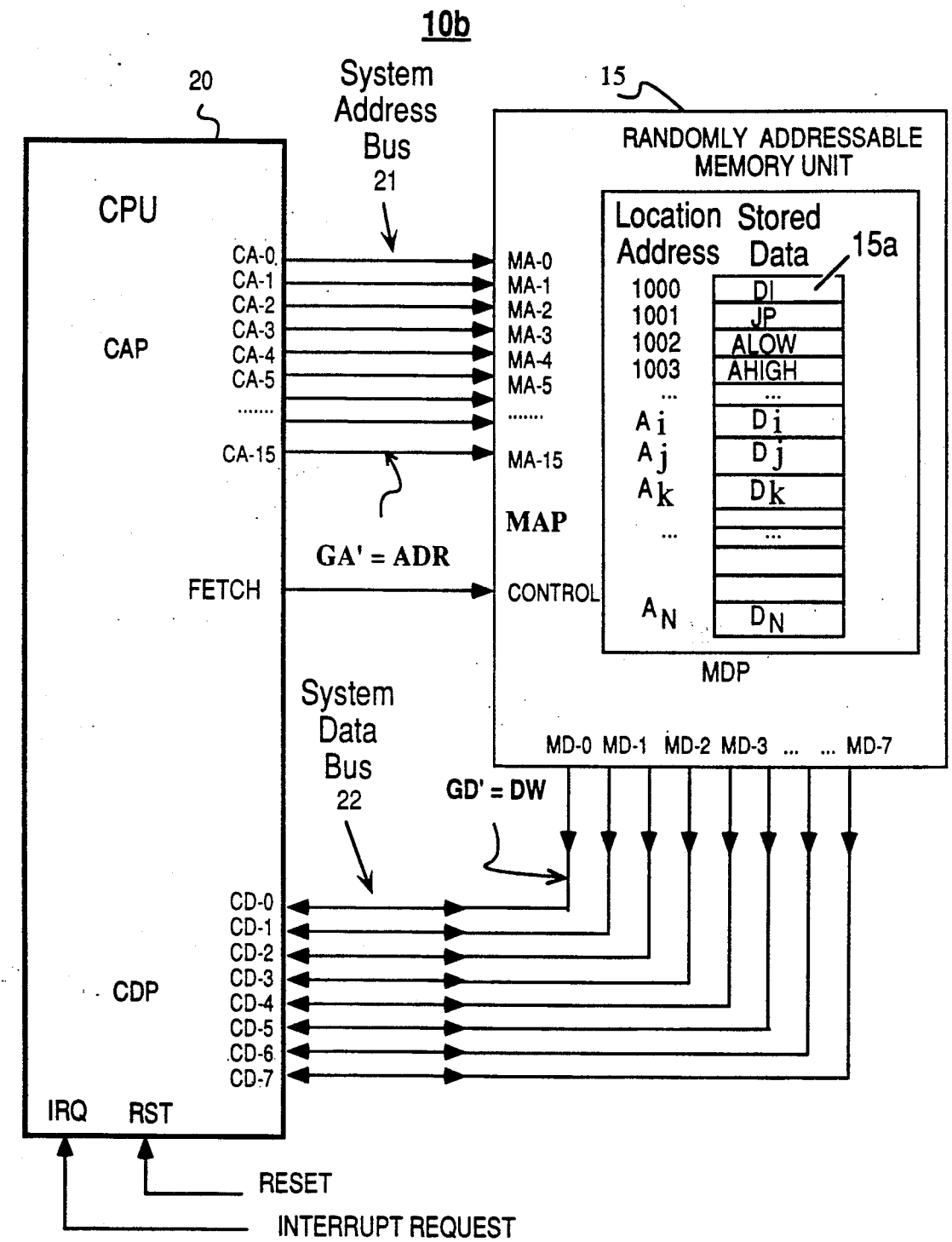
FIG. 1b is a block diagram illustrating how portions of the original data file stored in FIG. 1A are accessed sequentially in a conventional computer system.

The following detailed descriptions are of the best modes presently contemplated by the inventor for carrying out the invention. It is to be understood that the below described embodiments are merely exemplary of the invention and that their description is not to be taken in a limiting sense.

Referring to FIG. 1A, the traditional process for storing data in a randomly addressable memory device and retrieving the data will be first explained. While historically, the term "random access memory" has been used to indicate a volatile type of memory device (RAM) as distinguished from a nonvolatile read-only memory device (ROM), a similar term, "randomly addressable memory", will be used here, unless otherwise specified, to indicate a memory device having sequentially numbered storage locations which are randomly accessed by applying an appropriate address value (ADR) to an address input port. Locations may be addressed in an arbitrary sequence if desired, and hence, the term randomly addressable memory unit (RAMU) is used here. Such a memory unit (RAMU) can be either volatile (i.e. DRAM, SRAM) or nonvolatile (i.e., ROM) or contain a combination of volatile and nonvolatile sections.

Before data is extracted from a randomly addressable memory unit (RAMU), the data must first be stored into the memory unit. As shown in the memory programming arrangement 10a of FIG. 1A, a source file 11 is first created to define a sequence of data words $DW = D_0, D_1, D_2, D_3, \ldots, D_i, D_j, D_k, \ldots, D_N$. Each data word, $D_x$, (x being an arbitrary identifier here) is respectively associated with a unique address value $A_x$ found within a series of source file designated address values $ADR = A_0, A_1, A_2, A_3, \ldots, A_i, A_j, A_k, \ldots, A_N$. (The latter set defines a source address space.)

By way of a concrete example, the source file 11 in FIG. 1A is shown to define a computer program in which a first assembly-level instruction word, $D_0 =$ "DI" (disable interrupts), is associated with a first CPU address value, $A_0 = 1000$; a second instructional word, $D_1 =$ "JP" (jump unconditional to specified address), is to be associated with a second CPU address $A_1 = 1001$; and wherein high and low address values, ALOW and AHIGH, are to be associated with the sequentially following CPU address numbers 1002 and 1003. Such a source file 11 implies that a prescribed sequence of data retrievals will take place. The CPU is first to fetch the DI instruction word and perform an interrupt disabling operation. The CPU is then to fetch in the recited order, the data words: JP, ALOW, AHIGH and to perform a jump operation which transfers control to a location within the address space seen by the CPU as specified by the values of ALOW and AHIGH. For such a sequence of program operations to occur successfully, it is necessary for the CPU to generate address signals, GA, representing the appropriate sequence of address values (GA = 1000, 1001, 1002, 1003) and to apply these generated address signals, GA, to an address port of the memory unit. The appropriate data words DW are then retrieved from a data port (MDP) of the memory unit.

Data words, DW, are typically loaded into a randomly addressable memory unit RAMU such as the memory unit 15 shown in FIG. 1A in accordance with the following steps. The memory unit 15 (RAMU) is first coupled to a programming device 12 such as an EPROM programmer. Signals GD representing each of the source-file data words $D_i$, $D_j$, $D_k$, etc. are generated by a data signal generator portion 12a of the programmer 12 and these generated data signals GD are output on a predetermined number of source data lines, $SD_0$, $SD_1$, $SD_2$, \ldots, $SD_7$ (here, byte sized words of 8 bits apiece are assumed). The generated data GD signals are then applied to respectively numbered data receiving terminals $MD_0$, $MD_1$, $MD_2$, \ldots, $MD_7$, of a memory data port (MDP) provided on the memory unit 15. Each data word $D_x$ (x being an arbitrary identifier) comprises a bit sequence $B_1, B_2, \ldots, B_n$, of a predefined length and order (i.e., an eight bit word is often called a "byte"). Generated address signals, GA, representing the associated address value $A_x$, of each data word $D_x$ are produced by an address signal generator portion 12b of the programmer 12 and these generated address signals GA are output on a predetermined number of source address lines $SA_0, SA_1, SA_2, \ldots, SA_{15}$ (here, an address space of $2^{16}$ data words is assumed). The generated address signals GA are then applied to correspondingly numbered memory address input terminals $MA_0, MA_1, MA_2, \ldots, MA_{15}$ of a memory address port (MAP) provided on the memory unit 15. These address signals GA appear in paired association with the data signals GD generated by the data signal generator 12a. A load/store signal 16 is applied to a control terminal of the memory unit 15 to cause the memory unit 15 to load and store the data presented at its data input port MDP into a unique storage location 15a whose physical position is designated by the address value GA=ADR ADR presented at the memory address port MAP of the memory unit 15.

After the load/store operation is completed, a NEXT signal 17 is applied to the data signal generator portion 12a and address signal generator portion 12b of the programmer 12 to step the generator portions, 12a and 12b, to the next address value $ADR = A_{x+1}$ and its associated next dataword $DW = D_{x+1}$. The store and step process repeats until the programmer 12 has sequentially stepped through all the data words $D_0$–$D_N$ and associated address values $A_0$–$A_N$ of the source file 11 (through the "address space" of the source file). At the end of such sequencing, the data words $D_0$–$D_N$ are sequentially stored in an orderly fashion within the memory unit 15 as shown in FIG. 1A. The address values $A_0$ through $A_N$ which define the address space of the source file are not stored in the memory unit 15 but rather, their values are implied by a one-to-one equivalency mapping between the storage-location identifying address-numbers of the memory unit 15 and the address values ADR in the source file 11.

Referring to FIG. 1B, after data has been stored in the memory unit 15 as described for FIG. 1A, the sequence of data words $D_0$–$D_N$ that was first defined by the source file 11 may be recreated when desired by generating a new sequence of address value signals, $GA' = A_0, A_1, A_2 \ldots, AN$ corresponding to the generated address signals GA of FIG. 1 and applying these newly generated signals GA' to the address terminals $MA_0$–$MA_{15}$ of the memory unit 15. The corresponding data words $D_0$–$D_N$ are then regenerated in the form of new data signals GD' and presented at the data port terminals $MD_0$–$MD_7$ of the memory unit 15.

Quite often, a central processing unit (CPU) 20 of a computer system 10b is coupled via a system address bus (SAB) 21 and a system data bus (SDB) 22 to the memory unit 15, as shown in FIG. 1B, such that an address generating port CAP of the CPU 20 has its address-generating terminals $CA_0, CA_1, \ldots, CA_{15}$ respectively coupled to like numbered address-receiving terminals $MA_0, MA_1, \ldots, MA_{15}$ of the memory unit. The CPU 20 generates and outputs address signals $GA' = ADR$ onto the address bus 21 in order to address, gain access to and/or retrieve the data words $D_0$–$D_N$ stored within the memory unit. The CPU data terminals $CD_0, CD_1, \ldots, CD_7$ are similarly respectively coupled via the system data bus 22 to the like-numbered data terminals $MD_0, MD_1, \ldots, MD_7$ of the memory unit for transferring data words $D_0$–$D_N$ from locations 15a within the memory unit 15 to circuitry (i.e., registers) within the CPU 20 or vice versa.

Proper operation of the computer system 10b shown in FIG. 1B rests on a basic assumption. The basic assumption is that there is a one-for-one correspondence between the location address numbers (i.e., 1000, 1001, 1002, etc.) of the memory unit 15 and the address values $ADR = 1000, 1001, 1002$, etc., which were assigned to the original data words, DW, by the source file map 11.

A system reset signal (RST) automatically forces the CPU 20 to issue a power-up/reset address signal $GA' = 0000$ from its address port CAP onto the system address bus 21. A fetch control signal is sent to the memory unit 15 to retrieve the instruction words i.e., "JP 1000" (not shown) that have been prestored at memory location address 0000. This retrieved instruction word "JP 1000" (jump unconditional to location 1000) is then placed on the system data bus 22 in the form of a memory generated data word GD'. The CPU 20 inputs this generated data word GD' through its data port CDP and acts upon the inputted data word GD' in accordance with prespecified microcode defined within the CPU 20. If an inappropriate address signal, ADR, is applied to the address port MAP of the memory unit or, if the memory unit 15 generates an inappropriate data word, DW, from its data port MDP, the function which was originally intended by the source file 11, namely the performance of a jump operation ("JP") will not occur.

Referring to FIG. 2A, there is shown an apparatus 100a for storing source-file data in a randomly addressable memory unit 115 in accordance with the invention. A programmable address scrambling device (PASD) 118 is interposed between the address generating terminals $SA_0, SA_1, \ldots, SA_{15}$, of the address signal generator 12b and the address receiving terminals, $MA_0, MA_1, \ldots, MA_{15}$ of the randomly addressable memory unit 115. In the illustrated case, the PASD 118 is programmed to route the address signal generated by address signal generator terminal $SA_0$ to memory receiving terminal $MA_1$, (hereafter symbolized as $SA_0 \rightarrow MA_1$) and to correspondingly route the address signal generated by terminal $SA_1$ to memory terminal $MA_0$ (hereafter denoted as $SA_1 \rightarrow MA_0$). Thus, the stored data $D_0$ to $D_N$ is shuffled in the memory space of memory unit 115 so that original data word, $D_1 = $ "JP" is stored in the memory location which was previously occupied in FIG. 1A by data word $D_2$, so that original data word $D_2 = $ "ALOW" occupies the memory location originally occupied by data word $D_1$, and so that elsewhere in memory, original data word $D_k$ occupies the memory location originally occupied by data word $D_j$, and so on. The generated address signal output by the PASD 118 is denoted as $GA = ADR^*$, where $ADR^*$ is a function of the address value ADR produced by generator 12b and also a function of a pattern selecting key, K1, which is applied to the PASD 118 to create the illustrated address line shuffling patterns ($SA_0 \rightarrow MA_1$, and $SA_1 \rightarrow MA_0$).

It is to be understood that numerous address space transformation functions, other than the illustrated one ($SA_0 \rightarrow MA_1$, $SA_1 \rightarrow MA_0$) are contemplated here. Cross connections may be made from any one of the address sourcing terminals $SA_x$ of the address signal generator 12b to anyone of the address receiving terminal $MA_y$ of the memory unit 115; the subscripts, x and y, representing here arbitrary numbers. Also, the signal appearing on each address receiving terminal $MA_y$ may be derived from a logical operation (i.e., a combinatorial logic operation) performed on a plurality of signals appearing on a multitude of address sourcing terminals, i.e., $SA_0, SA_1, \ldots, SA_x$ rather than just one SA terminal. By way of example, logic level inverters (not shown) may be optionally placed between each address sourcing terminal $SA_x$ and each one or more corresponding address receiving terminal $MA_y$ to further scramble the original source-file address, ADR, so that a logic high (H) presented on the sourcing terminal $SA_x$ will appear as a logic low (L) on the corresponding address receiving terminal $MA_y$. Care should, of course, be taken to make sure that two unique address points in the address space of the source file 11 do not map into a single address point within the address space of the memory unit 115. The address transformation function ADR. $ADR^*$ of the programmable address scrambling device 118 is preferably chosen so that transformation can occur in minimal time (i.e., three gate delays or less). The reason for this will be apparent shortly.

Figure 2B:
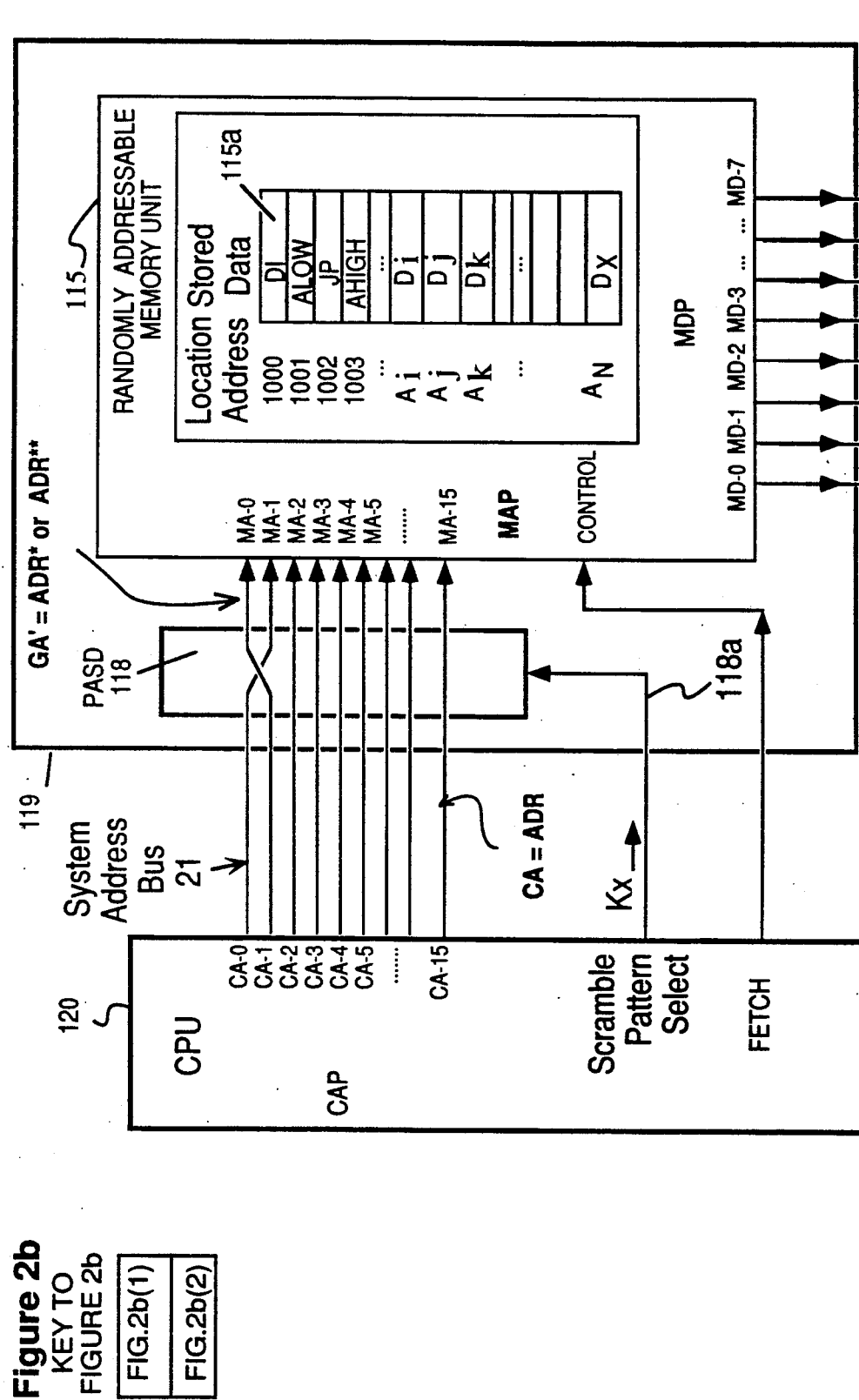
FIGS. 2b, 2b(1) and 2b(2) is a block diagram illustrating how the out-of-sequence stored data of FIG. 2A may be shuffled back into its original address space in accordance with the invention.

Referring to FIG. 2B, there is shown a computer system 100b which is provided with a secured package 119 incorporating therein the programmable address scrambling device (PASD) 118 and the randomly addressable memory unit (RAMU) 115. The PASD 118 and RAMU 115 may be defined as separate integrated circuit chips which are encapsulated in an appropriate epoxy to form the secured package 119, or, the PASD 18 and RAMU 115 may be integrally formed on the same monolithic substrate and this substrate (i.e., a silicon die) may then be secured within an appropriate IC package 119 if so desired. A scramble pattern select line 118a couples a system CPU 120 to the PASD 118 for programmably selecting a desired address scrambling function, $*K_x$, to be performed by the PASD 118, the superscript, Kx, being a transform-identifying key. Since information within the secured package 119 is retrieved properly only if an appropriate key, $K_x$, is supplied with each address request $CA = ADR$ of the CPU (or other information requesting device), the stored information is not readily available to persons or devices who/which do not produce the appropriate key.

In the illustrated case of FIG. 2B, the PASD 118 is shown to be appropriately programmed to scramble the address output lines $CA_0, CA_1, \ldots, CA_{15}$ of CPU 120 in the same fashion that the address generating terminals $SA_0, SA_1, \ldots, SA_{15}$ of the address signal generator 12b were scrambled in FIG. 2A, that is, to generate the address line shuffling pattern: $CA_0 \rightarrow MA_1$ and $CA_1 \rightarrow MA_0$. Under this condition, the CPU 120 is made unaware of the fact that the storage locations of the stored data $D_0-D_N$ were scrambled when the data was stored in the randomly addressable memory unit 115. Each address number, ADR, output by the CPU is appropriately mapped into a corresponding transformed-memory ADR* address number before being applied to the address port (MAP) of the memory unit 115; and the appropriate data word $GD' = DW(ADR^*)$ is generated onto the data terminals $MD_0-MD_7$ of the memory unit 115.

However, it should be apparent that if the PASD 118 is not programmed to perform the appropriate address mapping operation ADR→ADR* for transforming a CPU address number ADR into a memory unit address number ADR*, the wrong data word $GD' = DW(ADR^{**})$ will appear on the memory unit data port MDP. In the case of program words which are to be executed in a predefined sequence, i.e., OPC, $OPR_1, OPR_2$, (op-code, first-operand, second-operand; or more specifically, JP ALOW,AHIGH) a series of nonsense instructions, i.e., $OPR_2$, OPC, $OPR_1$, (more specifically, ALOW, JP, AHIGH) will emerge instead from the memory unit data port MDP and the CPU 120 will be unable to properly execute or retrieve a desired segment of software.

Referring to FIG. 3A, a data protecting method in accordance with the invention will be described. An original source file 300 is arbitrarily partitioned into a large number of segments and a different address scrambling algorithm ADR→ADR*$^k$ is preferably selected for scrambling the lesser significant address bits (i.e., $A_0-A_4$) of each segment. The address bits of intermediate significance (i.e., $A_5-A_{13}$) are preferably used to secretly denote whether a block of data belongs to one segment or another. After the illustrated source code is compiled or otherwise transformed into object code, it can become extremely difficult to tell where one segment ends and another begins and/or where the usage of one scrambling algorithm *$^i$ ends and the usage of another scrambling algorithm *$^j$ begins. The address bits of most significance (i.e., $A_{14}$ and $A_{15}$) are preferably used to divide the address space (defined in this example by $A_0$ to $A_{15}$) into blocks that will or will not be scrambled. This will be explained in more detail by referring to FIGS. 3A, 3B and 4 in combination.

Figure 4:
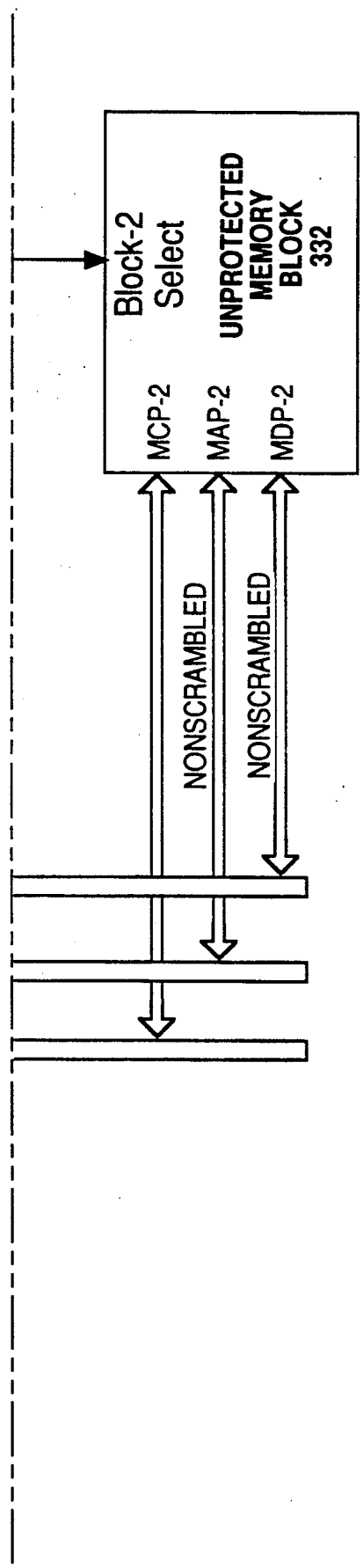
FIGS. 4, 4(1) and 4(2) is a block diagram of a computer system incorporating a programmable address scrambling device according to the invention.

The left side of FIG. 3A shows schematically an original source file 300 whose contents are to be protectively stored in a memory unit such as the RAMU 331 shown in FIG. 4. The address space of the original source file 300 is divided to include a first span ($0000_{hex}$–$7FFF_{hex}$ by way of example) for storing relatively constant data such as instruction words (i.e., in EPROM) and a second span ($8000_{hex}$–$FFFF_{hex}$ by way of example) for storing temporary and/or variable data (in scratch pad or RAM).

The original source file 300 is studied and an identification is made of code which is to be accessed at random times (i.e., interrupt vectors and interrupt service routines) and also of code which is to be accessed relatively quickly or at a relatively high repetition rate (i.e., interrupt vectors, program stack, globally shared variables or constants, globally shared subroutines). A further identification is made of code which should always be accessed in accordance with a prescribed sequence. By way of example, the original source file 300 of FIG. 3A is shown to include a first code sequence at source-file location 1000 which directs the CPU to jump to address ADR1 and from there to jump to a loop sequence beginning at source-file address ADR2. The jump-on-zero code JP Z, ADR2 in the loop sequence presumably directs the CPU to the subroutine calling code, CALL $SUB_2$, a large number of times. The loop escape code JP NZ, ADR3 (jump-on-not-zero) presumably directs the CPU out of the ADR2 loop only occasionally. Thus, the code of source-file locations ADR2 and SUB2 are tightly grouped by high frequency accessing (many times per second) while the code for source file address ADR3 (not shown) is not as tightly grouped to the loop because relatively few references per second are made to ADR3 by the loop.

According to a first step of the invention, the memory space of the original source file 300 is partitioned to define a partitioned source file 302. Partitioned address space areas within the partitioned source file 302 are referred to as numbered data segments, i.e., data segment-1, data segment-2, ... data segment-6. Partitioning is preferably performed so that each resultant data segment incorporates within its boundaries data words between which a relatively large number of back and forth accesses per second (i.e., jumps) will occur and so that relatively few data accesses per second will occur across boundaries of the data segments. For example, the original source file 300 is shown to include an address location ADR2 which references the address location SUB2 periodically and presumably many times per second by way of a CALL instruction. Data segment-4 in the partitioned source file 302 is shown to incorporate both the subroutine calling code of source-file address ADR2 and the return code of subroutine SUB2 because access to such code is to be granted within a tight loop. Source-file address bits of intermediate significance (i.e., $A_5$ through $A_{13}$) are used to secretly designate the span of each data segment.

A different address scrambling pattern, i.e., scramble pattern-1, scramble pattern-2 ..., scramble pattern-5, is generally assigned to each of the data segments. In some cases, i.e., data segment-5 and data segment-3, a common scrambling pattern is assigned. In other cases, i.e., data segment-1 and data segment-6, there will be no scrambling and no scrambling pattern is assigned. When the locations of the data words in the various data segments are ultimately scrambled, it should be possible to utilize the same scrambling pattern for data words which are to be sequentially referenced within a "tight" data retrieving loop (i.e., the AD2 loop). Preferably, no scramble pattern is assigned to a scratch pad span (i.e., within $8000_{hex}$–$FFFF_{hex}$) and to an interrupt vector area (i.e., $0000_{hex}$–$0FFF_{hex}$, the location of such vectors varies from one CPU to another). Moreover, no scramble pattern is assigned to globally shared subroutines which need to be accessed frequently from all other segments of the partitioned source file 302 and no scramble pattern is assigned to any globally shared constants or variables which also need to be accessed frequently from all segments of the partitioned source file 302.

If necessary, the original source file 300 is rewritten during the formation of the partitioned source file 302 so as to move the globally shared (common) subroutines and/or all power-up and interrupt servicing routines to one or more areas in the address space of the partitioned source file 302 which will not be scrambled. The illustrated example of FIG. 3A shows that the address spans ($0000_{hex}$–$0FFF_{hex}$ and $8000_{hex}$–$FFFF_{hex}$), which are located respectively at the very beginning and very end of the entire address space ($A_0$ to $A_{15}$) of the partition source file 302, will be designated as non-scrambled regions while the intermediate span ($1000_{hex}$–$7FFF_{hex}$) will be designated as a region that is to be scrambled.

Referring momentarily to the computer system 310 shown in FIG. 4, it can be seen that at least two memory blocks, 331 and 332 are to be provided, where a first of the memory blocks, 331, is designated to store protected code while a second of the memory blocks, 332, is designated to store unprotected code. The code within the intermediate span $1000_{hex}$–$7FFF_{hex}$ of partitioned source file 302 is to be stored, after scrambling, in the protected memory block 331. The code within the terminal spans $0000_{hex}$–$0FFF_{hex}$ and $8000_{hex}$–$FFFF_{hex}$ of the partitioned source file 302 is to be stored, without scrambling, in the unprotected memory block 332. An address decoder 307 which is coupled to a system address bus 321, selects one or the other of the protected and unprotected memory blocks, 331 and 332, in accordance with an address decoding operation (i.e., combinatorial logic) which determines whether an address value ADR presented on the system address bus 321 falls within the intermediate span $1000_{hex}$–$7FFF_{hex}$ or the terminal spans $0000_{hex}$–$0FFF_{hex}$ and $8000_{hex}$–$FFFF_{hex}$.

Referring back to FIG. 3A and specifically to the right side of FIG. 3A, there is shown a hypothetical scrambled source file 305a which is developed by shuffling only the lesser significant address bits (i.e., $A_0$ to $A_4$) of the partitioned source file 302 while leaving the intermediate (i.e., $A_5$–$A_{13}$) and more (i.e., $A_{14}$–$A_{15}$) significant address bits of source file 302 unchanged. This hypothetical source file 305a is shown so that the correlation between the original source file 300 and a finally scrambled source file 305 (FIG. 3B) may be easily understood. A middle span of the address space belonging to the scrambled file 305a is shaded to indicate that its contents are scrambled while the top and bottom ends of the address space belonging to the scrambled file 305a are left unshaded to indicate that these are not scrambled. The data word "DI" which was originally located at address $1000_{hex}$ of the original source file 300 is shuffled into a new location $1000*^2$ in the address space of the scrambled file 305a, the suffix symbol, $*^2$, indicating here that a transformation has occurred from the location number 1000 of the original source file 300 to a new MAP number $1000*^2$. Different code ("##") is stored at the location designated by MAP number 1000. It can be seen that after the data segments are defined by partitioning (step 302) and different scrambling patterns are assigned to each segment, the positioning of the data words within the spans of their respective segments and/or within the address space span of the scrambled file 305a is reordered or shuffled so that, for example, the data words which were originally located at address ADR1 of the original source file 300 are no longer positioned in this same address point within the address space of shuffled file 305a but rather, different code "##" is stored there. The original address assignments, i.e., at ADR1 of the data word sequence i.e. CALL SUB1 no longer hold true, and instead, the same data words are now positioned in an address space region whose coordinates, ADR1*, are a transform of the original address coordinates ADR1. If the jump code "JP ADR1" of data segment-1 is to truly reference the code "CALL SUB1" of data segment-3 as intended, the memory referencing value "ADR1" of data segment-1 must first be transformed to a value representing the new location value ADR1* within the shuffled file 305a. However, unless on knows beforehand that the referenced code "CALL SUB1" has been assigned to data segment-3 and that the referencing code "JP ADR1" has been assigned to a different data segment-1, it is not possible to know from the resultant object code, that a segment boundary crossing is about to take place and that a scramble pattern switching operation (from pattern-2 to pattern-3) is first needed as the "JP ADR1" operation is performed.

The illustration of the shuffled file 305a was provided as guidance for what will ultimately happen after shuffling occurs, but an additional step should preferably be performed before shuffling. Referring to FIG. 3B, it can be seen that the partitioned source file 302 is first edited to add key-switching code KSW before shuffling is implemented. The segment-crossing code i.e., "JP ADR1", of the partitioned source file 302 is crossed out (erased) and rewritten as shown at 303 to include the appropriate key-selecting code, KSW. As an example, the "JP ADR1" code of segment-1 is rewritten, to read: "COPY key-switching-routine KSW to scratch-pad address SP-1" and this is followed by "COPY the jump instruction JP ADR1 to scratch-pad address SP-2." This is then followed by a transfer (JP) to scratch pad location SP-1. When the rewritten code of edited file 303 is executed, a key-switching operation is performed within the unscrambled address space of the scratch pad before an attempt to made to reference the target code, CALL SUB1, of address ADR1 in the original source file 300. Code in the scratch pad area 8000-FFFF does not have to be descrambled as can be seen by referring to FIG. 4, and accordingly, a key-switching operation does not affect its validity.

Referring to FIG. 4, the code belonging to the written source file 303 (FIG. 3B) is stored in shuffled form within the protected memory block 331 (FIG. 4). CPU 320 transfers the scrambled code of the boundary crossing segment shown at 303 (FIG. 3B) into scratch pad which is located in unprotected memory block 332. The transference automatically unshuffles the downloaded code, and thus, this downloaded code may be accessed without using a scramble-pattern-selecting key. A new scramble-pattern-selecting key is generated by executing the sequence illustrated in the scratch pad portion of 303, namely, load accumulator with key select data and move accumulator to key select address. In terms of Z-80 assembly (Z-80 is a microprocessor available from Zilog Corporation), this may be written as:

```
     LD BC, 11        ; No. of bytes to copy
     LD DE,SP1        ; Destination address is
                        unscrambled area
     LD HL,KSW        ; Source address is within
                        scrambled area
     LDIR             ; Copy source to destination
     JP SP1           ; Jump to destination
KSW: LD A,K3          ; Load Accumulator with Key data
     OUT (KADR),A     ; Output key data
     XOR A            ; Clear A
     LD (KSW+1),A     ; Erase key data
```

-continued

```
JP ADR1        ; Jump to next scrambled segment
```

The LDIR instruction copies the eleven bytes of the KSW code to destination address SP1. The LD A,K3 instruction loads the accumulator with a prespecified key number. The OUT (KADR),A instruction places the key number, K3 on the system data bus 322 while simultaneously activating the select line, Sel-P emerging from the address decoder 307 into an address scrambler 318 so that the key number K3 on the address bus 321 is loaded and stored into a register within the address scrambler 318. The LD (KSW+1),A code erases the key value K3 from unscrambled RAM. The JP ADR1 instruction of the KSW code continues execution at the appropriate address in the protected memory block 331, but this occurs after the key value stored within the address scrambler 318 has been changed to the new value K3.

Figure 5A:
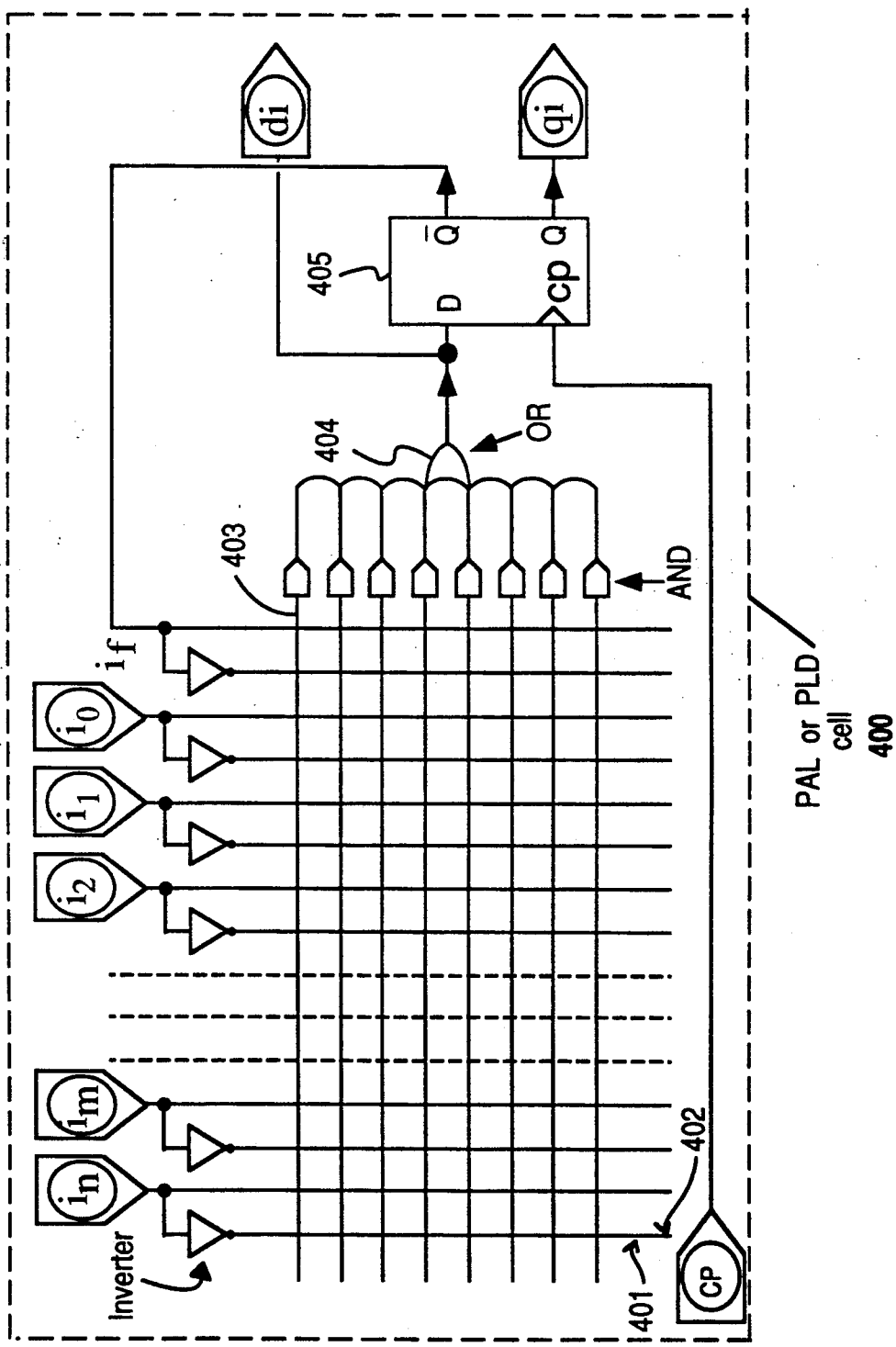
FIG. 5A shows a schematic diagram of a programmable logic device (PLD) which may be used for constructing a programmable address scrambling device and or programmable data word scrambling device in accordance with the invention.

Referring to FIG. 5A, the structure of a programmable scrambling device 318 in accordance with the invention will now be explained. FIG. 5A is a schematic diagram of a well-known device which is referred to in the industry either as a programmable logic array (i.e. PAL) or a programmable logic device (PLD) 400. The PLD 400 comprises a set of data input terminals, $i_0$, $i_1$, $i_2$ ..., $i_m$, $i_n$, each of which is respectively coupled directly and/or by way of an inverter to a pair of vertically extending wires, 401 and 402. Horizontally extending wires 403 cross over the vertically extending wires 401 and 402, to enable the formation of a Boolean product term including therein any of the logic levels on the input terminals $i_0$–$i_n$ or their complements. An OR gate 404 is provided for generating a sum of the Boolean product terms. This sum of products is output on data terminal $d_j$. The D input terminal of a flip flop 405 is coupled to the data output terminal $d_j$ for generating a registered output $q_j$ on a second output terminal of the PLD 400. Clock terminal CP strobes the flip flop 405 to load data presented at the D input terminal of the flip flop into a latch within the flip flop 405. A feedback term $i_f$ is provided from the complementary $\bar{Q}$ output line of the flip flop 405 and this feedback term $i_f$ is coupled to an additional pair of vertical lines, 401 and 402.

Figure 5B:
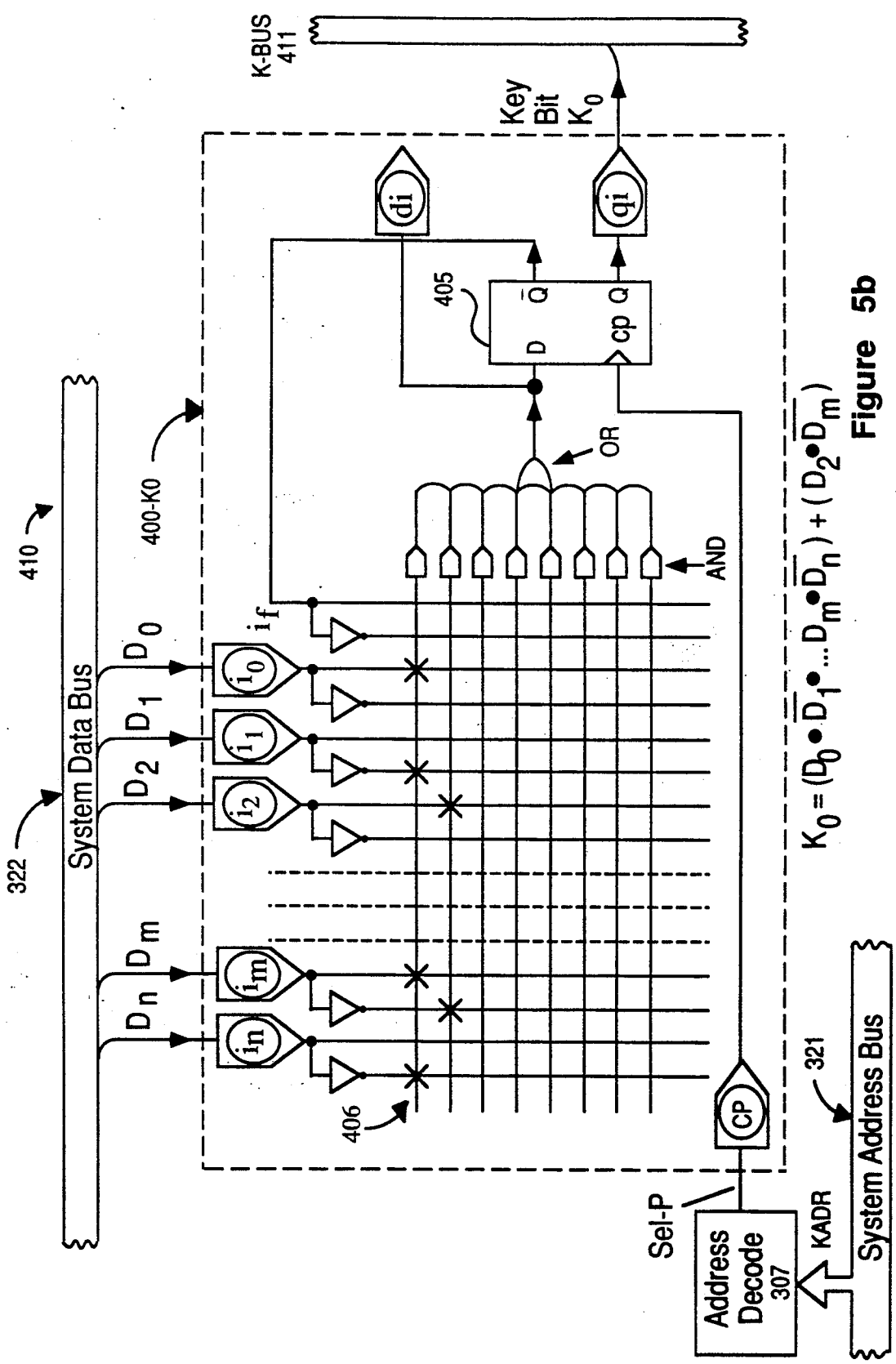
FIG. 5B shows a first programming pattern applied to a section of the programmable logic device of FIG. 5A for generating and storing a key bit.

Referring to FIG. 5B, there is shown a key-generating circuit 410 incorporating a programmed PLD 400-K0 similar to the PLD 400 just described. Input terminals $i_0$–$i_n$ are respectively coupled to system bus lines $D_0$, $D_1$, $D_2$ ..., $D_m$, $D_n$. Crosses 406 in FIG. 5B denote programmed connections between the vertical (401, 402) and horizontal (403) lines. These connections may be made in accordance with many well known techniques including for example mask programming, fuse blowing, anti-fuse activation and so forth. The preferred programming method here is to use so-called electrically programmable memory cells (such as used in EPROM memory devices). This type of connection formation is difficult to detect and reverse engineer. The 20G10 PLD available from Cypress Semiconductors Inc. of California is an example of a user-programmable device of this nature.

Figure 6:
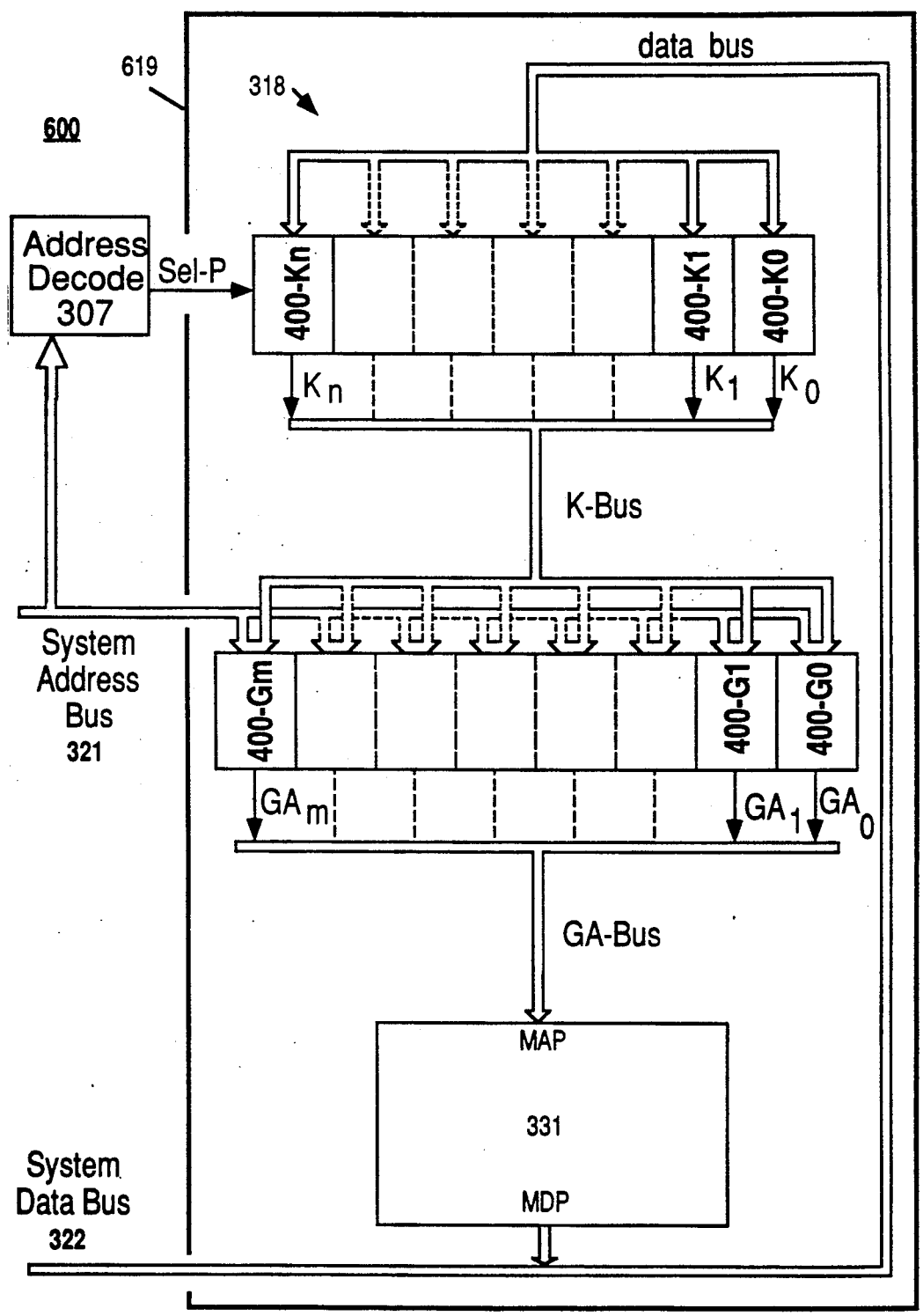
FIG. 6 is a block diagram of a programmable address scrambling device in accordance with the invention.

The registered output terminal $q_j$ of the PLD 400-K0 generates a first key bit $K_0$ which merges into a key bus (K-Bus) that is defined by a plurality of similar key bits, each generated from a similar key-generating circuit 400-$K_x$, x being here an arbitrary identifier (see FIG. 6). The clock input terminal CP of the PLD 400-K0 is driven by an address decoder circuit 307 which strobes the PLD register 405 with a select signal, Sel-P, when a predefined address value KADR is presented on system address bus 321 (i.e., during the OUT (KADR),A instruction). When this address value KADR is detected on the system address bus 321, the data word DW then present on the system data bus 322 is decoded by the PLD 400-K0 according to the programming 406 of the PLD and either a logic high (H) or logic low (L) is stored in the flip flop 405. The stored data is presented as a constant level on the $q_j$ output terminal of the PLD 400-K0 and transmitted therefrom onto the K-bus.

The Boolean function generated by the illustrated programming 406 of the PLD 400-K0 may be represented as the sum of products:

$$K_0 = (D_0 \cdot D_1 \ldots D_m \cdot D_n) + )(D_2 \cdot D_m)$$

where the bar above each product term denotes a binary complement Additional sum or product equations may be further developed to generate in similar circuits 400-K1 through 400-K3 (FIG. 6), the key-bits $K_1$ through $K_3$ as indicated by the functions $f_1$ to $f_3$:

$$K_1 = f_1(D_0, D_1, D_2, \ldots D_m, D_n)$$

$$K_2 = f_2(D_0, D_1, D_2, \ldots D_m, D_n)$$

$$K_3 = f_3(D_0, D_1, D_2, \ldots D_m, D_n)$$

where a key word KW is defined by the bit sequence $K_0$, $K_1$, $K_2$ and $K_3$ (KW = $K_0$, $K_1$, $K_2$, $K_3$).

Figure 5C:
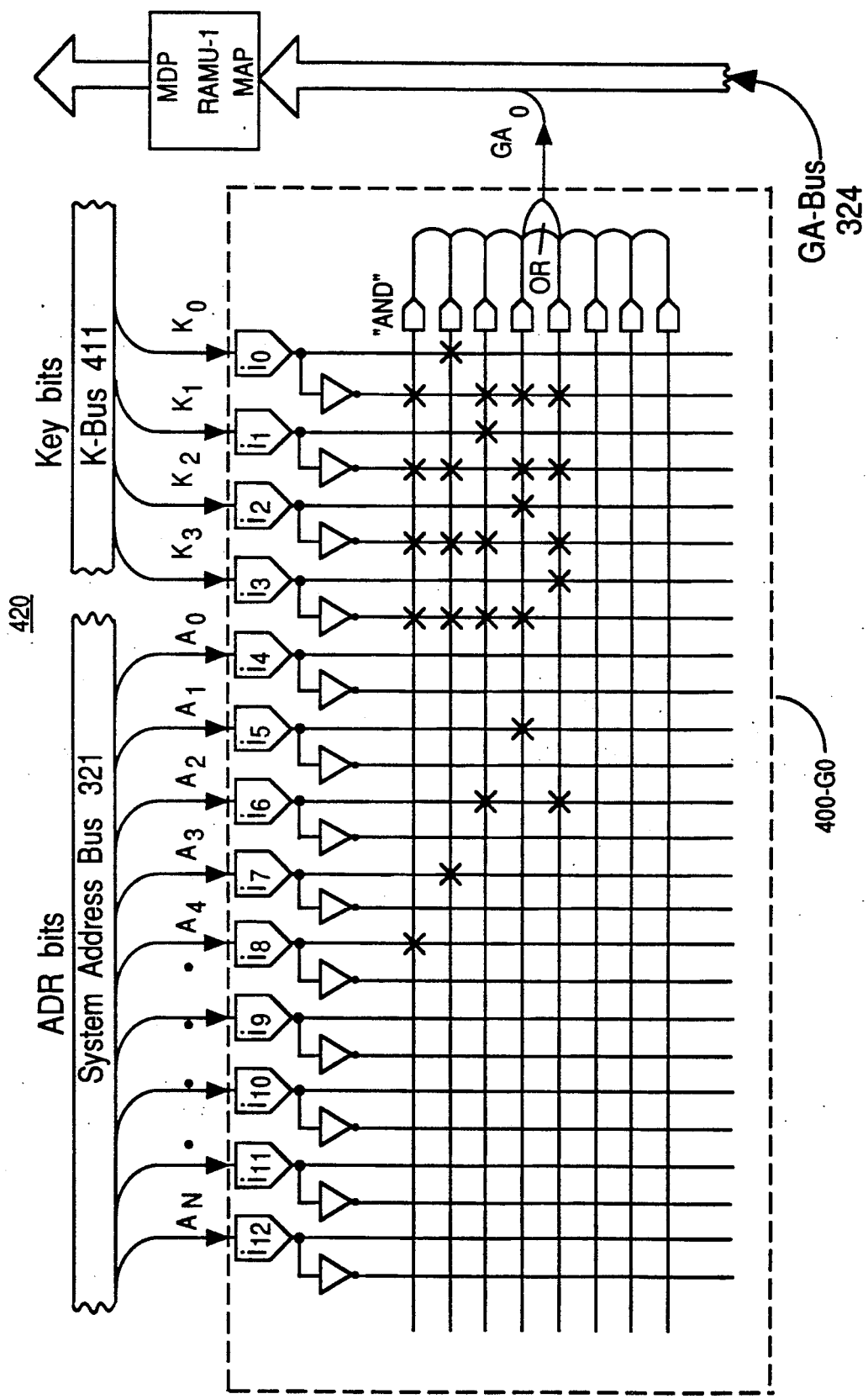
FIG. 5C shows a second programming pattern applied to a section of the programmable logic device of FIG. 5A for generating a scrambled address bit.

Referring to FIG. 5C, the key bits $K_0$–$K_3$ developed by key-generating circuits such as the one 400-K0 shown in FIG. 5B are applied to the input terminals of another PLD circuit 400-GD in combination with preselected address lines $A_0$–$A_n$ from the system bus 321 in order to generate a first generated address bit $GA_0$ as shown. The corresponding equation for programming the illustrated PLD 400-G0 is as follows:

$$GA_0 = (\bar{K_3}\bar{K_2}\bar{K_1}\bar{K_0})A_4 + (\bar{K_3}\bar{K_2}\bar{K_1}K_0)A_3 +$$
$$(\bar{K_3}\bar{K_2}K_1\bar{K_0})A_2 + (\bar{K_3}K_2\bar{K_1}\bar{K_0})A_1 + (K_3\bar{K_2}\bar{K_1}\bar{K_0})A_2$$

Those skilled in the art will recognize that the generated address bit $GA_0$ will be the same as the address bit $A_4$ under the condition when all the key bits $K_0$ through $K_3$ are equal to a logic zero, that is, KW = 0000. When KW = 0001, $GA_0 = A_3$; when KW = 0010, $GA_0 = A_2$; when KW = 0100, $GA_0 = A_1$; and when KW = 1000 the result is $GA_0 = A_2$.

Additional functions may be formed in further PLD's 400-G1 through 400-G4 as defined by:

$$GA_1 = (\bar{K_3}\bar{K_2}\bar{K_1}\bar{K_0})A_2 + (\bar{K_3}\bar{K_2}\bar{K_1}K_0)A_4 +$$
$$(\bar{K_3}\bar{K_2}K_1\bar{K_0})A_3 + (\bar{K_3}K_2\bar{K_1}\bar{K_0})A_0 + (K_3\bar{K_2}\bar{K_1}\bar{K_0})A_0$$

$$GA_2 = (\bar{K_3}\bar{K_2}\bar{K_1}\bar{K_0})A_0 + (\bar{K_3}\bar{K_2}\bar{K_1}K_0)A_1 +$$
$$(\bar{K_3}\bar{K_2}K_1\bar{K_0})A_4 + (\bar{K_3}K_2\bar{K_1}\bar{K_0})A_3 + (K_3\bar{K_2}\bar{K_1}\bar{K_0})A_4$$

$$GA_3 = (\bar{K_3}\bar{K_2}\bar{K_1}\bar{K_0})A_1 + (\bar{K_3}\bar{K_2}\bar{K_1}K_0)A_2 +$$
$$(\bar{K_3}\bar{K_2}K_1\bar{K_0})A_0 + (\bar{K_3}K_2\bar{K_1}\bar{K_0})A_4 + (K_3\bar{K_2}\bar{K_1}\bar{K_0})A_3$$

$$GA_4 = (\bar{K_3}\bar{K_2}\bar{K_1}\bar{K_0})A_3 + (\bar{K_3}\bar{K_2}\bar{K_1}K_0)A_0 +$$
$$(\bar{K_3}\bar{K_2}K_1\bar{K_0})A_1 + (\bar{K_3}K_2\bar{K_1}\bar{K_0})A_2 + (K_3\bar{K_2}\bar{K_1}\bar{K_0})A_1$$

In tabular form (TABLE 1) the transformation from an address bus word, ADR=$A_4$, $A_3$, $A_2$, $A_1$, $A_0$, to a scrambled address work ADR*=$GA_4$, $GA_3$, $GA_2$, $GA_1$, $GA_0$, may be represented as:

TABLE 1

| keyword value KW = | 0 | 1 | 2 | 4 | 8 | Other |
|---|---|---|---|---|---|---|
| ADR* Bits | | | | | | |
| $GA_0$ = | $A_4$ | $A_3$ | $A_2$ | $A_1$ | $A_2$ | X |
| $GA_1$ = | $A_2$ | $A_4$ | $A_3$ | $A_0$ | $A_0$ | X |
| $GA_2$ = | $A_0$ | $A_1$ | $A_4$ | $A_3$ | $A_4$ | X |
| $GA_3$ = | $A_1$ | $A_2$ | $A_0$ | $A_4$ | $A_3$ | X |
| $GA_4$ = | $A_3$ | $A_0$ | $A_1$ | $A_2$ | $A_1$ | X |

The above Table 1 is merely exemplary of the various transformations which may take place with different key words KW. It should be apparent that any generated address bit $GA_x$ may be formed as a function of not only the address bits $A_0$–$A_4$ but also of their complements $\overline{A_0}$–$\overline{A_4}$. More complex transformation will become apparent to those skilled in the art upon further study. The preferred transformation functions according to the invention should use no more than three gate level (i.e., NOT, AND, OR) between the system address bus (SAB) and the memory address port (MAP-1) so that minimal delay will be added to the memory access time of the system. The delay added by the PASD should be preferably 25 nanoseconds or less and will vary depending on whether CMOS, TTL, ECL or other logic is used.

Referring to FIG. 6, a memory device 600 including an address scrambling portion 318 and a protected information storing portion 331 is shown in block diagram form. The device 600 is protectively packaged in a secure enclosure 619 (i.e., IC package or epoxy) such that only a P-selecting line, Sel-P, enters the enclosure together with the wires of a system address bus (SAB) 321 and a system data bus (SDB) 322. The circuitry of the memory device 600 may be formed on a single semiconductor substrate (integrated circuit chip) or it may be formed of a hybrid combination of separate integrated circuit chips which are protectively housed in the enclosure 619, if so desired. When address decoder 307 outputs a select signal, Sel-P, the data word DW, which is present on the system data bus 322, will be loaded into the internal flip-flops 405 of key generating circuits 400-$K_0$, 400-$K_1$ ... 400-$K_n$ to thereby generate a new key word KW=$K_0$, $K_1$, ... $K_n$. This new key word KW is held constant until the next time a select signal, Sel-P, is generated by the address decoder 307 and the key word KW is presented on a key word bus, K-Bus, for coupling to the scrambled address generating modules, 400-$G_0$, 400-$G_1$, ... $G_m$. An address word ADR on the system address bus 321 is also input into the scrambled-address generating modules 400-$G_0$, 400-$G_1$, ... 400-$G_n$ for generating the scrambled address word ADR*=$GA_0$, $GA_1$, ... $GA_m$. This scrambled address word ADR* is then applied to the memory address port (MAP) of the protected memory block 331 and a corresponding stored data word DW (ADR*) is generated out on the memory data port (MDP) for use by the requesting device (i.e., the system CPU).

Figure 7:
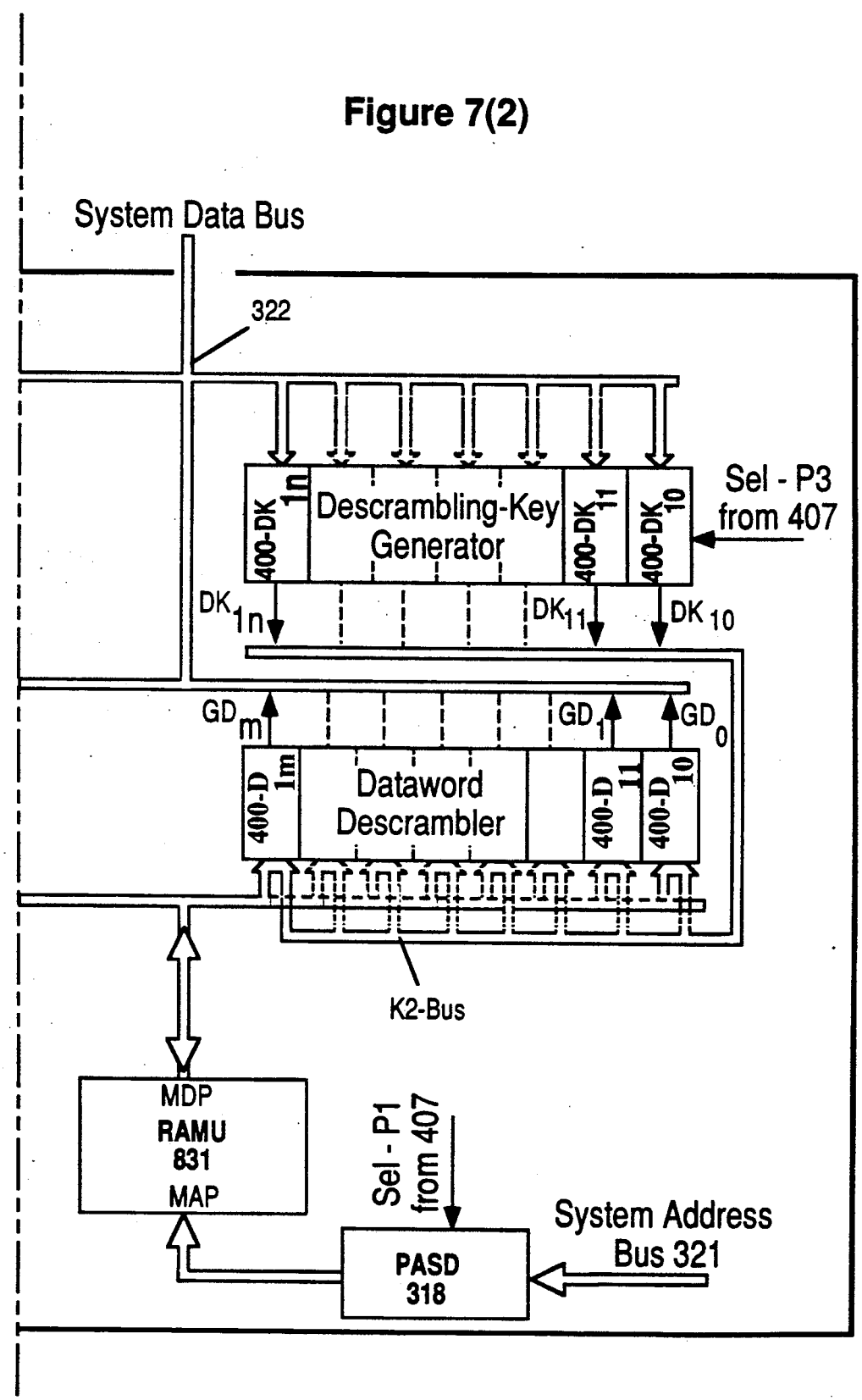
FIGS. 7, 7(1) and 7(2) is a schematic diagram of a programmable data word scrambling and descrambling device in accordance with the invention.

Referring to FIG. 7, the individual bits, $B_0$, $B_1$, ... $B_n$ of each data word DW may also be scrambled, if desired, using a similar structure, 718. A data scrambling key word, DKW=$DK_0$, $DK_1$, ..., $DK_n$ is loaded into the internal flip-flops of data key generating circuits 400-$DK_0$, 400-$DK_1$, ... 400-$DK_n$ when the address decoding circuit 407 outputs a select signal, Sel-$P_2$. The generated data key word DKW is transmitted on a first data key bus, K1-Bus, to scrambled-data generating modules 400-$D_0$, 400-$D_1$, ... 400-$D_m$ for generating a scrambled data word DW*=$GD^*_0$, $GD^*_1$, ... $GD^*_m$, which is then input to the memory data port MDP of the memory area 331 for protected storage. When a dataword is to be output to the system data bus, descrambling occurs in descrambler circuit 400-$D_{10}$ through 400-$D_{1m}$. The keys for descrambling are developed on second key bus K2-BUS. A new key is generated by descrambling-key producing circuit 400-$DK_{10}$ through 400-$DK_{1n}$ when 407 outputs a Sel-P3 strobe signal. The respective key words for scrambling and descrambling can be made different from one another (i.e., when appropriate scramble and descramble algorithms are used) and thus greater security may be provided.

Figure 8:
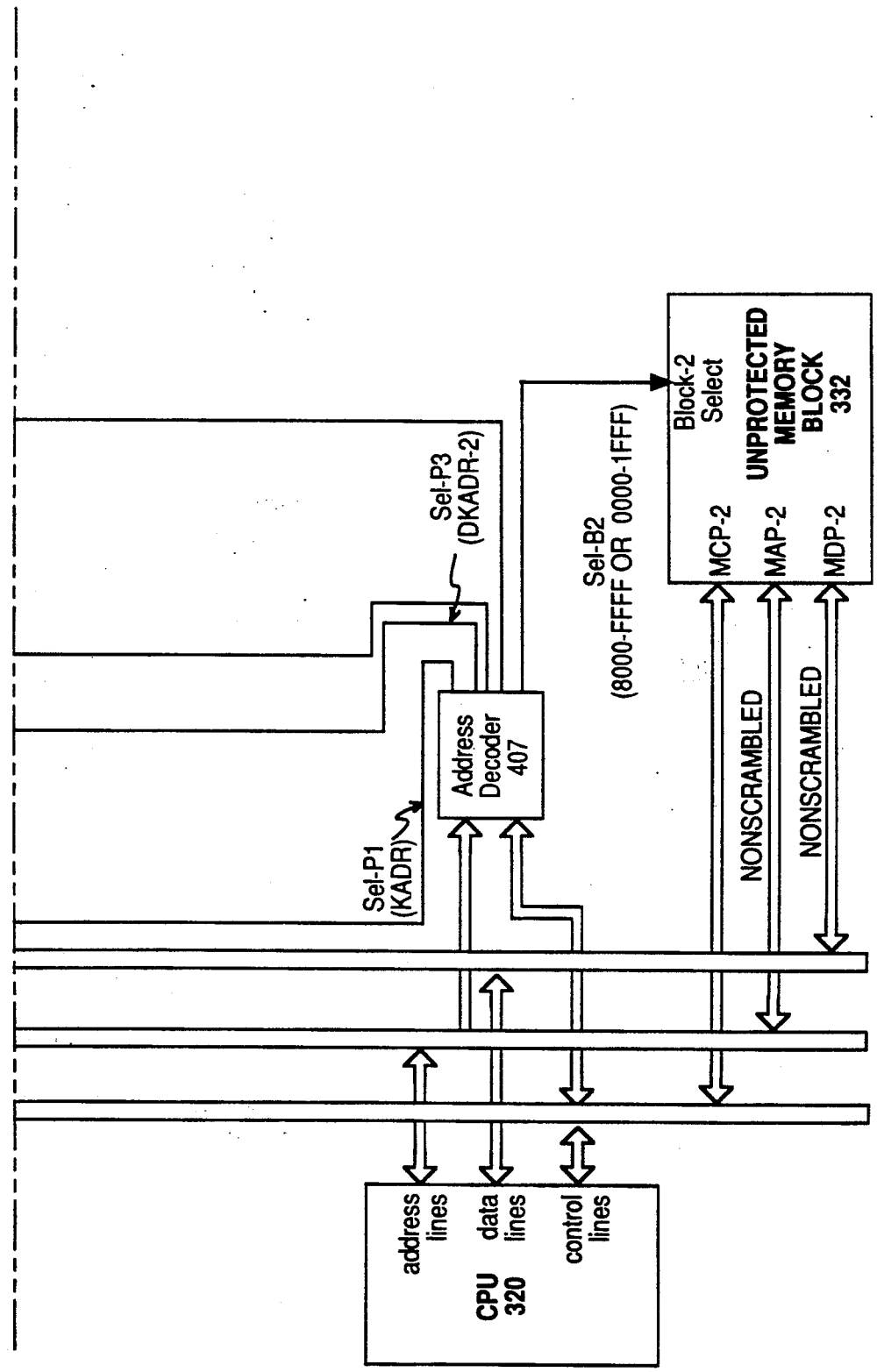
FIGS. 8, 8(1) and 8(2) is a block diagram of a computer system incorporating both an address scrambling device and a dataword scrambling/descrambling device according to the invention.

Referring to FIG. 8, there is shown a computer system 800 incorporating both the address scrambling device 318 and data word scrambling/descrambling device 718 of the invention. Since different keys can be used for scrambling addresses and scrambling/descrambling datawords, it is more difficult to crack this data protecting scheme. Key changing boundaries for address keys may be made different than those for data keys. And different keys can be used for storing datawords as opposed to retrieving datawords out of storage. Of course dataword scrambling adds more delay to memory access time and this should preferably be limited to 3 gate delay times or less between the system data bus (SDB) and the memory data port (MDP).

Referring to FIG. 9, there is shown a schematic diagram of a simple computer system 900 according to the invention. A Z-80 microprocessor is coupled to an 8-bit wide system data bus and a 16-bit wide system address bus. Address bits $A_5$ through $A_{14}$ are coupled directly to a 27C512 EPROM (referenced as 902) while address bits $A_0$ through $A_4$ pass through a Cypress 20G10 PAL (918) device wherein they are scrambled to produce protected address bits $P_0$ through $P_4$, and the latter protected address bits $P_0$–$P_4$ are then coupled to the $A_0$ through $A_4$ terminals of the 27C512 EPROM (902). A new key word is loaded into the address scrambling device 918 when chip select-not line $CS_{15}$/ goes low and the write enable-not line WR/ of the CPU also goes low. The EPROM 902 is enabled when address bit $A_{15}$ goes low while the 62256 SRAM chip (referenced as 903) is enabled when the most significant address bit $A_{15}$ goes high. The Z-80 CPU 901 receives external event information from various interrupting devices such as a Z-80 CTC timer chip 920 on the interrupt input terminal INT of the Z-80. It is not easy to know from inspection of the code within the EPROM 902 alone just when some key switching operation should take place and when it shouldn't because extrinsic data can be placed on the system data bus by one of many other devices 930 and such extrinsic data can be used to create trap code for catching would-be pirates as they scan through protected areas of memory.

An example of a segment of trap code is as follows:
SERVICE EXTERNAL INTERRUPT ROUTINE:

| IN A,(IOADR) | ; input external data from ; interrupting I/O device |
|---|---|
| SUB 5 | ; (substract 5 from the accumulator) |
| JP C, ADRBAD | ; (A should never be less than 5) |
| JP Z, ADROK1 | ; this is an acceptable branch |

-continued

| | |
|---|---|
| JP NZ, ADROK2 | ; this is another acceptable<br>; address |

In the above code, when the trap door jump to address ADRBAD is selected to see what happens if a carry is generated, the CPU will jump to another segment having a different scrambling pattern and immediately it will encounter nonsense code. The would-be pirate does not know this, however, because such a pirate has no roadmap of where one data-segment begins and another ends and no way of knowing (without aid of the comments in the source code) that some jumps should never happen.

The above is merely exemplary of the invention and should not be used to limit the scope of the following claims.

What is claimed is:

1. A method for protecting datawords within a source-file from unauthorized use after information representative of such datawords is stored in a randomly addressable memory unit having accessible and number data storing locations, the method comprising the steps of:
    defining a first sequence in which information pieces representative of two or more datawords of the source-file are to be accessed by a prescribed data processing unit;
    storing said information pieces which are representative of the source-file datawords in the numbered locations of the memory unit according to a second sequence such that the numbered locations of the memory unit need to be addressed in a sequence different from the predefined first sequence if the stored information pieces are to be accessed by the data processing unit according to the first sequence;
    storing key-generating data in the memory unit for generating descrambling key signals; and
    providing descramble means, coupled to the memory unit and responsive to the descrambling key signals, for addressing the numbered locations of the memory unit so as to enable the data processing unit to access the information pieces from the memory unit in accordance with the first sequence.

2. The method of claim 1 further comprising the step of
    locating said descramble means outside said data processing unit.

3. The method of claim 1 further comprising the step of securely housing said descramble means and said memory unit in a security housing such that descrambled address signals transmitted from the descramble means to the memory unit are not accessible outside the security housing.

4. A data protection system comprising:
    (a) first memory means, having addressable memory locations, an address port and a data port,
    the first memory means being for storing protected datawords in the addressable memory locations
    where each protected dataword is associated with a source-file address different from a storage address defining the location in the first memory means where the protected dataword is stored.
    the address port of said first memory means being provided for receiving a storage address signal and the data port being provided for outputting a dataword signal representing a dataword stored in the addressable memory location designated by the storage address signal received at the address port;
    (b) data requesting means for supplying a data-request signal representative of the source-file address of a desired dataword; and
    (c) address scrambling means, coupled to the data requesting means the address port of the first memory means, for scrambling in accordance with one of a plurality of address scrambling algorithms the data-request signal supplied by the data requesting means to thereby produce and apply to the address port of the first memory means a scrambled storage address signal which is either representative or not representative of the storage address of the dataword associated with the source-file address represented by the data-request signal;
    where the address scrambling means has a key input port for receiving a key work which designates one of the plurality of address scrambling algorithms which may be carried out by the address scrambling means as the one to be carried out, where an appropriate key word is required for selecting the one address scrambling algorithm which will convert a data-request signal representative of the source-file address into a scrambled storage address signal representative of the storage address of the dataword desired by the data requesting means, and
    where said first memory means stores information representative of at least one appropriate key.

5. The data protection system of claim 4 wherein an address space defined by the memory locations of the first memory means is divided into a plurality of address spans, and wherein protected datawords stored in a first of the memory spans are scrambled in accordance with a first address scrambling algorithm and wherein datawords stored in a second of the memory spans are scrambled in accordance with a different, second address scrambling algorithm.

6. The method of claim 5 wherein the boundaries of said address spans are arbitrarily selected.

7. The data protection system of claim 4 further comprising:
    (d) second memory means, having accessible and addressable memory locations, an address port and a data port,
    the second memory means being for storing non-protected datawords in its addressable memory locations, the second memory means including a volatile section for temporarily storing unscrambled data; and
    (e) key-switching means for downloading a key-switching program into the volatile section of the second memory means and executing the downloaded key-switching program.

8. The data protection system of claim 7 wherein the key-switching program includes downloading instructions for downloading key-switching code from a protected section in the first memory means to an unprotected section in the second memory means, transfer instructions for transferring execution from the protected area in the first memory means to an unprotected area in the second memory means where the downloaded code was downloaded to, key-generating instructions for generating a new scrambling key, and second transferring instructions for transferring execution from the unprotected area in the second memory means to a new protected area in the first memory means whose datawords are scrambled in accordance with the newly generated key.

9. The data protection system of claim 4 wherein the address scrambling means interposes no more than a delay of three logic levels between the data requesting means and the address port of the first memory means.

10. The data protection system of claim 9 wherein the three or less logic levels of the address scrambling means consist of a NOT level, an AND level and an OR level.

11. A data protection system according to claim 4 further comprising a dataword scrambling means coupled to the data port of the first memory means for scrambling or descrambling data passing between the data port of the first memory means and the data requesting means in accordance with one of a plurality of predetermined dataword-scrambling algorithms.

12. The data protection system of claim 11 wherein the dataword scrambling means interposes a delay of four or less logic levels between the data requesting means and the data port of the first memory means.

13. The data protection system of claim 4 wherein the address scrambling means is programmable on the fly such that a different address scrambling algorithm may be selected by applying a new key word to the key input port of the address scrambling means.

14. The data scrambling device of claim 12 wherein the dataword scrambling means has two data-key input ports, one for selecting a scrambling key when datawords are input into the first memory means for storage and another data-key input port for descrambling datawords as they are output from the first memory means data port to the data requesting device.

15. A data protection system according to claim 4 wherein the address scrambling means includes electrically programmable circuitry for defining the address scrambling algorithms such that the address scrambling algorithms and the keys necessary for selecting an appropriate one of the address scrambling algorithms may be changed on the fly by reprogramming the electrically erasable/programmable (EEPROM) section of the address scrambling means.

16. A computer system structured to discourage unauthorized use of software stored therein, the system comprising:
a data processing unit;
a system bus operatively coupled to the data processing unit for opening carrying address signals generated by the data processing unit, data signals produced or used by the data processing unit and cipher-key signals generated by the data processing unit;
address scrambling means operatively coupled to the system bus to receive the address signals and cipher-key signals of the system bus for scrambling the address signals of the system bus in accordance with one of a plurality of predefined scrambling algorithms selected by a cipher-key signal received over the system bus to thereby produce corresponding scrambled-address signals; and
dataword storing means operatively coupled to the address scrambling means to receive the scrambled-address signals produced by the scrambling means and to output data signals representing datawords stored in locations of the dataword storing means as indicated by the received scrambled-address signals,
wherein the dataword storing means stores key-generating datawords which are used by the data processing unit to generate the cipher-key signals and file-specified datawords which are used by the data processing unit to carry out operations specified by a source file, the file-specified datawords being distributed among the locations of the storing means such that one or more appropriate cipher-key signals must be generated by the data processing unit to select an appropriate one or more of the predefined scrambling algorithms if the operations specified by the source file are to be appropriately carried out.

17. The system of claim 16 wherein said address scrambling means includes a programmable logic array.

18. The system of claim 16 wherein said address scrambling means and datawords storing means are securely enclosed in a security enclosure.

19. The system of claim 16 wherein two or more key-generating datawords are stored in said storing means and one key-generating dataword is used to generate an appropriate cipher-key signal used for locating a next key-generating dataword.

20. A method for protecting information in a source file from unauthorized use after data representing the source file is stored in a content-accessible memory unit, the memory comprising:
partitioning the source file into a plurality of segments each to be scrambled by a different scrambling algorithm;
storing the data representing each segment in locations of the memory unit according to the different scrambling algorithms; and
storing descramble keys in said memory unit.

* * * * *